(12) United States Patent
Higashitani et al.

(10) Patent No.: US 11,469,540 B2
(45) Date of Patent: Oct. 11, 2022

(54) MOLDING METHOD OF WATERPROOF MEMBER

(71) Applicant: YAZAKI CORPORATION, Tokyo (JP)

(72) Inventors: Masanobu Higashitani, Kakegawa (JP); Madoka Ooishi, Makinohara (JP); Masayuki Tamano, Makinohara (JP); Yasuhiro Tanaka, Kakegawa (JP); Hiroki Kitagawa, Kakegawa (JP); Yusuke Tsutagawa, Kakegawa (JP); Masatoshi Yamada, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 13 days.

(21) Appl. No.: 17/239,153

(22) Filed: Apr. 23, 2021

(65) Prior Publication Data

US 2021/0336377 A1 Oct. 28, 2021

(30) Foreign Application Priority Data

Apr. 24, 2020 (JP) .............................. JP2020-077398

(51) Int. Cl.
  *B29C 45/14* (2006.01)
  *H01R 13/52* (2006.01)
  (Continued)

(52) U.S. Cl.
  CPC ......... *H01R 13/5208* (2013.01); *B29C 39/10* (2013.01); *B29C 45/14* (2013.01);
  (Continued)

(58) Field of Classification Search
  CPC .............. B29C 45/14; B29C 45/14065; B29C 45/14426; B29C 45/14639; B29C 2045/14122; B29C 2045/14229
  (Continued)

(56) References Cited

U.S. PATENT DOCUMENTS 3,542,328 A * 11/1970 Deitrick ............ B29C 45/14639
425/588
4,314,960 A * 2/1982 Hass ...................... B22D 19/04
264/277

(Continued)

FOREIGN PATENT DOCUMENTS

| JP | 51-092088 A | 8/1976 |
| JP | 53-98360 A | 8/1978 |

(Continued)

*Primary Examiner* — Edmund H Lee
(74) *Attorney, Agent, or Firm* — Sughrue Mion, PLLC

(57) ABSTRACT

A molding method of a waterproof member is provided. The waterproof member is molded by molds and is for a coated electric wire. The molds include mold division surfaces including molding portions and electric wire mold clamping portions. The electric wire mold clamping portions are to sandwich the coated electric wire at sides of the molding portions. One of the electric wire mold clamping portions includes a convex portion and a side wall erected on an end of the convex portion. The other of the electric wire mold clamping portions includes a concave portion. One of the molding portions includes a side wall entering groove into which the side wall enters. The method includes molding the waterproof member accommodated in the concave portion with the waterproof member being pressed by the convex portion toward a direction in which one of the mold is attached to the other.

3 Claims, 20 Drawing Sheets

(51) Int. Cl.
  *H01R 43/24* (2006.01)
  *B29C 39/10* (2006.01)
(52) U.S. Cl.
  CPC .. *B29C 45/14065* (2013.01); *B29C 45/14426* (2013.01); *B29C 45/14639* (2013.01); *H01R 13/5216* (2013.01); *H01R 43/24* (2013.01)
(58) Field of Classification Search
  USPC ......................................................... 264/241
  See application file for complete search history.

(56) References Cited

U.S. PATENT DOCUMENTS

| | | | |
|---|---|---|---|
| 5,971,733 A * | 10/1999 | Huang | B29C 45/14639 425/127 |
| 6,503,436 B1 | 1/2003 | Koguchi et al. | |
| 9,555,256 B2 * | 1/2017 | Jullien | H01R 13/5224 |
| 2010/0047376 A1 * | 2/2010 | Imbeau | B29C 45/2673 425/542 |
| 2014/0144011 A1 | 5/2014 | Sugimoto et al. | |
| 2014/0299353 A1 * | 10/2014 | Saito | H01B 7/282 29/868 |
| 2016/0111842 A1 | 4/2016 | Sugimoto et al. | |
| 2017/0165885 A1 * | 6/2017 | Goll | B29C 45/1671 |

FOREIGN PATENT DOCUMENTS

| | | |
|---|---|---|
| JP | 10-649 A | 1/1998 |
| JP | 2000-208232 A | 7/2000 |
| JP | 2012-003856 A | 1/2012 |
| JP | 2013-030274 A | 2/2013 |
| JP | 2013-41677 A | 2/2013 |
| JP | 2017-039284 A | 2/2017 |
| WO | 2013/022117 A1 | 2/2013 |
| WO | 2018/202644 A1 | 8/2018 |

\* cited by examiner

FIG. 13
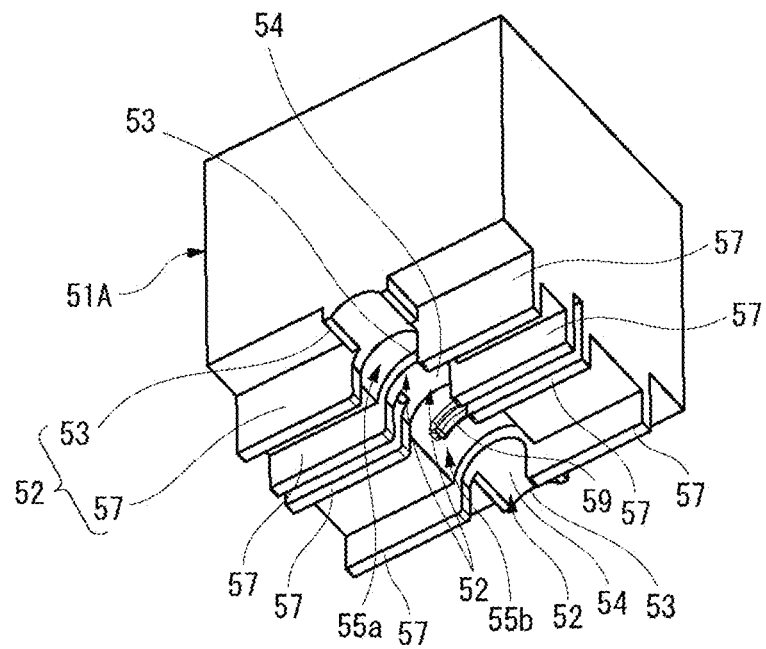
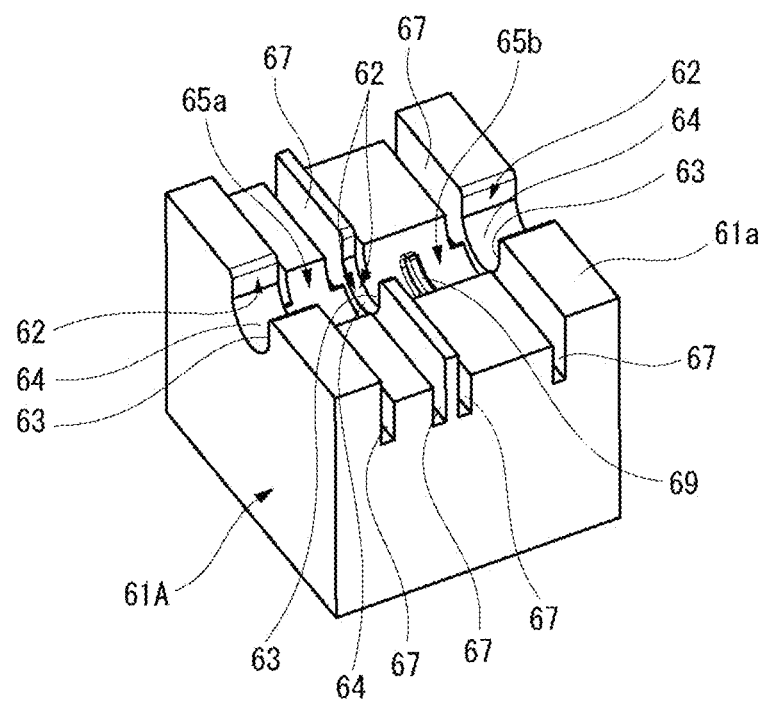

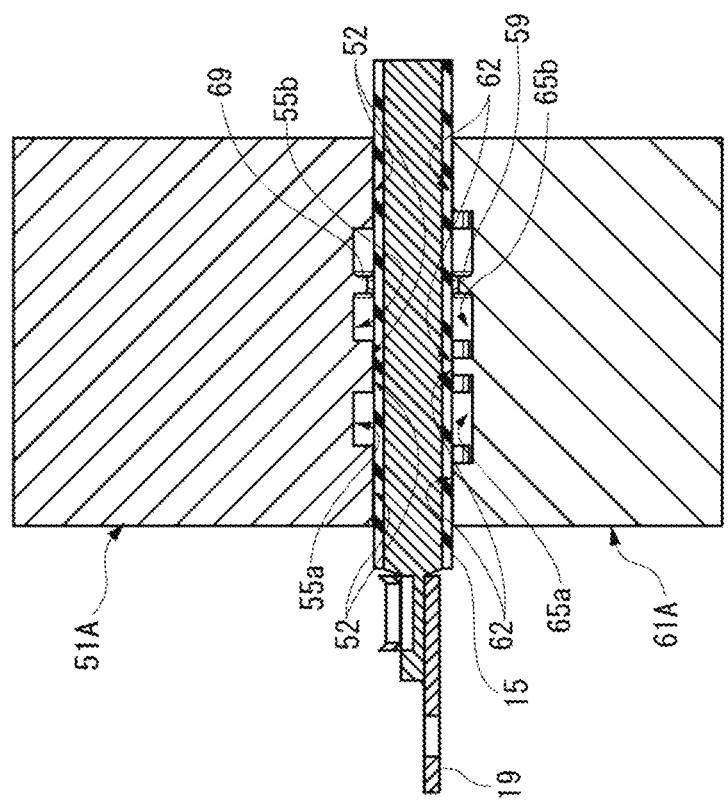
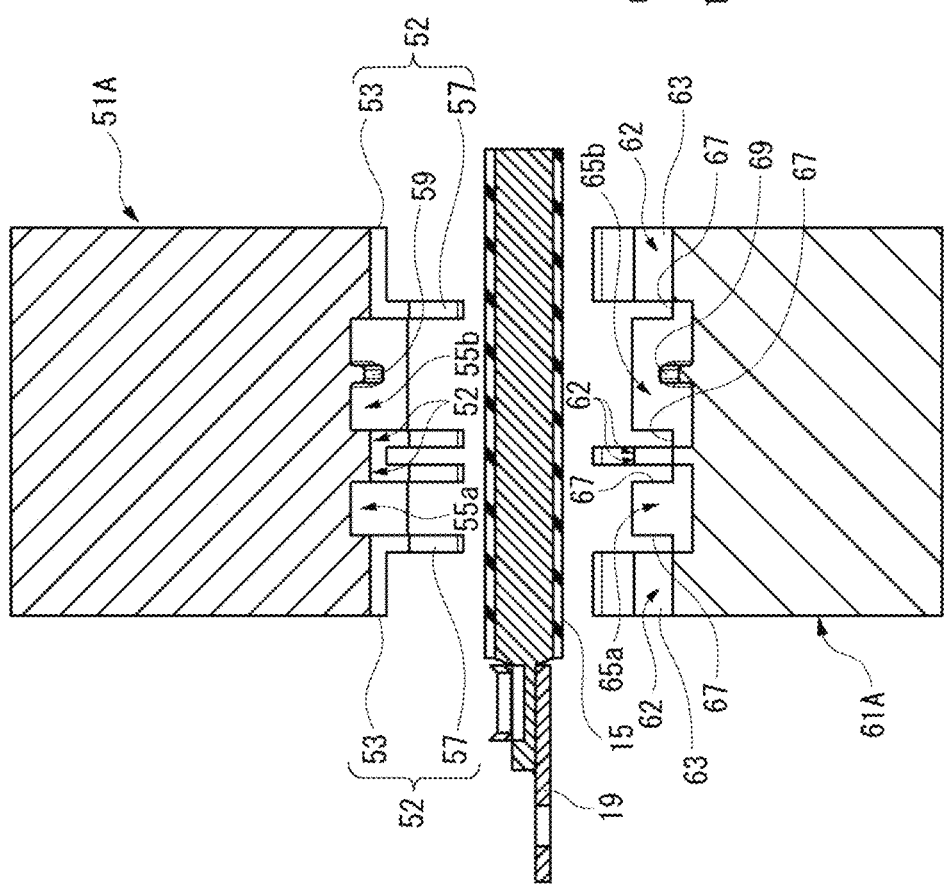

MOLDING METHOD OF WATERPROOF MEMBER

CROSS-REFERENCE TO RELATED APPLICATION

The present application claims priority to Japanese Patent Application No. 2020-077398 filed on Apr. 24, 2020, the entire content of which is incorporated herein by reference.

TECHNICAL FIELD

The present invention relates to a molding method of a waterproof member configured to cover a coating of a coated electric wire.

BACKGROUND

A related art waterproof structure includes a waterproof member for ensuring waterproofness between an attachment hole of an attachment portion and a coated electric wire inserted through the attachment hole. A connector having such waterproof structure in the related art includes a primary molded portion (waterproof member) formed of an insulating elastic material that covers an exposed portion of a conductor of a wire harness (electric wire) including a conductor and a coating portion, and a secondary molded portion formed of an insulating resin that covers almost the entirety of the primary molded portion and a part of a terminal (see, for example, JP2013-41677A). In this connector, an elastic member such as an elastomer is used in the primary molded portion contacting an outer peripheral surface of an electric wire coating (hereinafter, simply referred to as a "coating") of the wire harness in a pressed manner, so that a connector having good waterproofness is manufactured.

In the waterproof member, since a portion of the waterproof member covering the coating of the electric wire has a cylindrical shape, it is necessary to fit upper and lower molds each having a semicircular cavity (molding portion) at the time of injection molding. Since the electric wire has a large variation in diameter and the coating thereof is often soft, it is necessary to compress and mold the electric wire using the upper and lower molds when the waterproof member is primarily molded. However, when the diameter of the electric wire is increased, a cross-sectional area of the electric wire is increased with respect to a cross-sectional area of a clamping portion of the upper and lower molds. As a result, the coating may be interposed in a gap between the upper and lower molds, the coating may be damaged or broke, and an insulation property or a waterproof property may be deteriorated. In addition, when the diameter of the electric wire is reduced, the coating is deformed by an injection pressure at the time of injection molding, a gap may be formed between the upper and lower molds and burrs may be generated, which may cause poor external appearance.

Illustrative aspects of the present invention provide a molding method of a waterproof member configured to prevent deterioration in waterproof function due to poor external appearance of a coated electric wire, and damage or breakage of a coating of the coated electric wire.

SUMMARY

According to an illustrative aspect of the present invention, a molding method of a waterproof member is provided. The waterproof member is molded by a pair of molds. The waterproof member is configured to surround a part of a coated electric wire in an extending direction of the coated electric wire in which the coated electric wire extends. The pair of molds includes a first mold and a second mold. The first mold has a first mold division surface. The second mold has a second mold division surface. The first mold division surface includes a first molding portion and a first electric wire mold clamping portion. The second mold division surface includes a second molding portion and a second electric wire mold clamping portion. The first and second molding portions are configured to mold the waterproof member when the waterproof member is injection-molded. The first and second electric wire mold clamping portions are configured to, when the first mold is attached to the second mold with the coated electric wire being disposed between the first and second molds, sandwich the coated electric wire at both sides of each of the first and second molding portions in the extending direction of the coated electric wire. The first electric wire mold clamping portion includes a first convex portion having a first semi-cylindrical concave surface configured to contact an outer peripheral surface of the coated electric wire and a side wall erected on an end of the first convex portion in the extending direction of the coated electric wire, the end being connected to the first molding portion. The second electric wire mold clamping portion includes a first concave portion including a second semi-cylindrical concave surface configured to contact the outer peripheral surface of the coated electric wire while being opposed to the first convex portion, the first concave portion having a U-shaped cross section. The second molding portion includes a side wall entering groove formed by cutting out a part of the second molding portion, the side wall entering groove being configured such that, when the first mold is attached to the second mold, the side wall enters the side wall entering groove. The method includes molding the waterproof member accommodated in the first concave portion with the waterproof member being pressed by the first convex portion toward a first direction in which the first mold is attached to the second mold.

Other aspects and advantages of the invention will be apparent from the following description, the drawings and the claims.

BRIEF DESCRIPTION OF DRAWINGS

FIG. 13 is a perspective view showing first and second mold division surfaces of the pair of molds shown in FIG. 12;

FIGS. 14A and 14B are cross-sectional views taken along the extending direction of the coated electric wire in the pair of molds shown in FIG. 12, in which FIG. 14A shows the opened state and FIG. 14B shows a mold clamped state;

DESCRIPTION OF EMBODIMENTS

Figure 1:
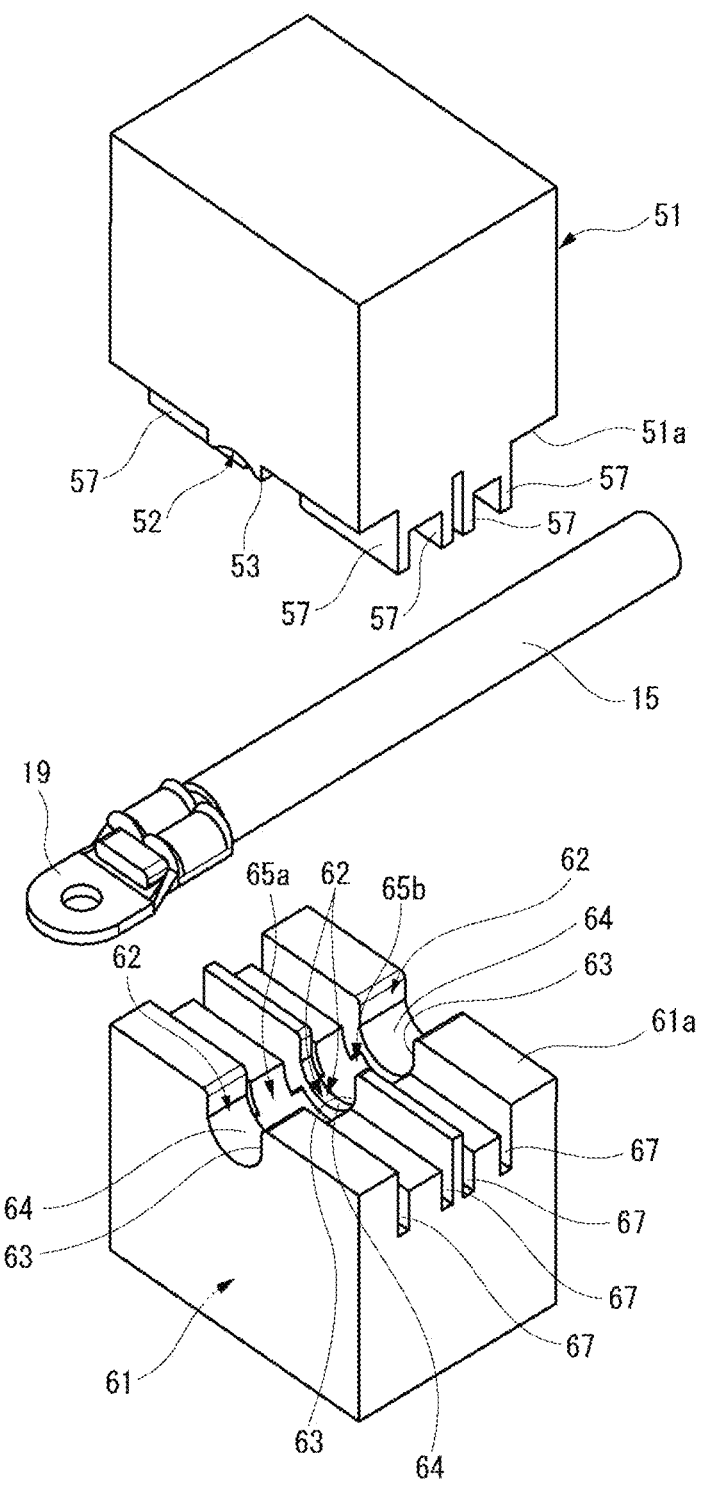
FIG. 1 is a perspective view showing an opened state of a pair of molds used in a molding method of a waterproof member according to an embodiment of the present invention.
Figure 2A:
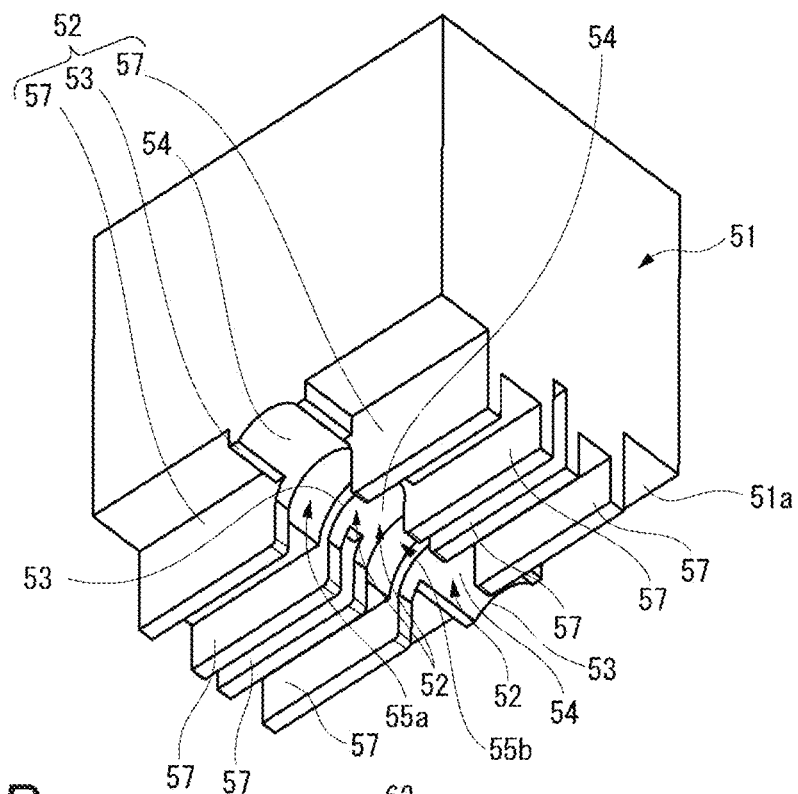
FIGS. 2A and 2B are perspective views showing first and second mold division surfaces of the pair of molds shown in FIG. 1.
Figure 2B:
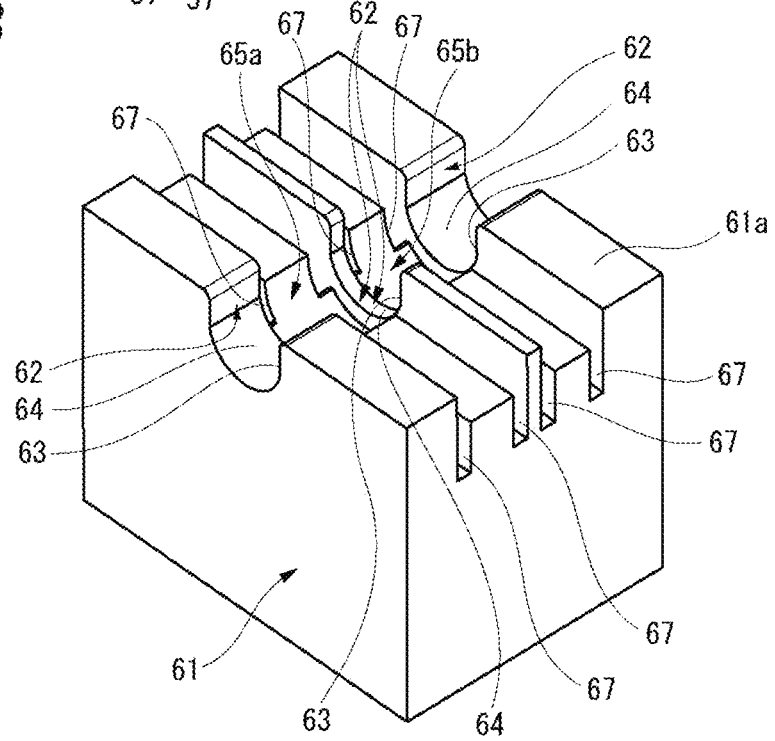
Figure 3:
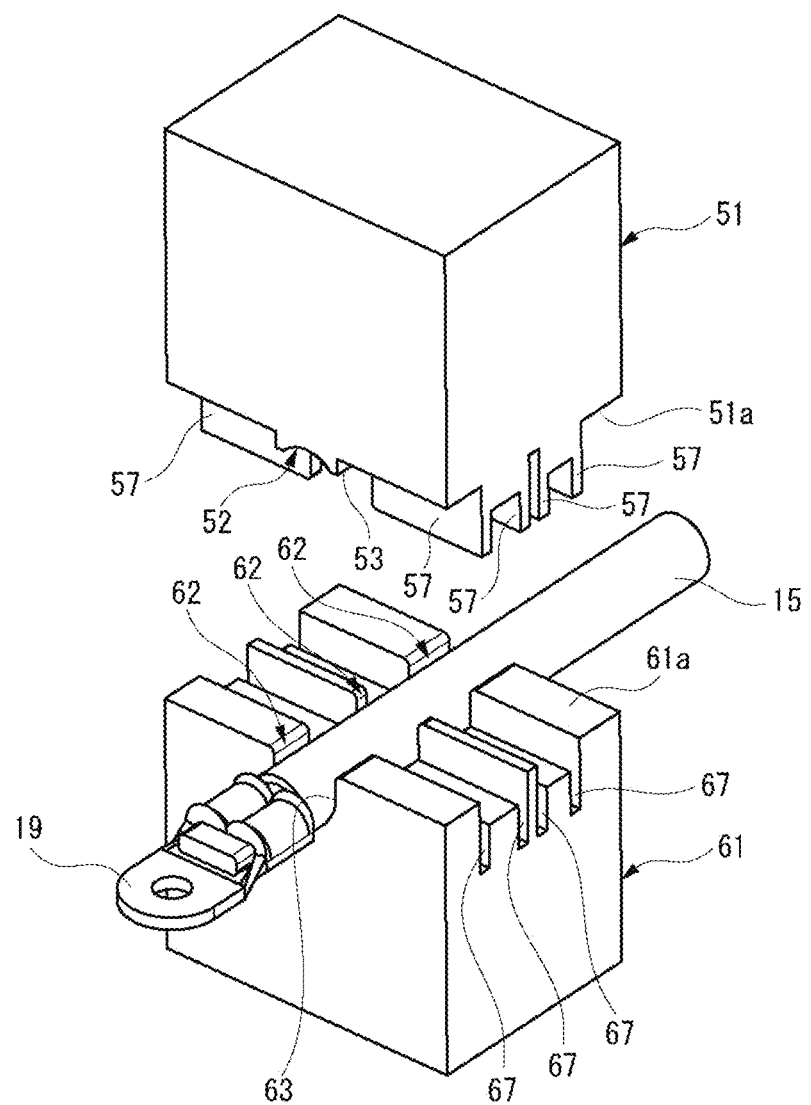
FIG. 3 is a perspective view showing a state in which a coated electric wire is set in the pair of molds shown in FIG. 1.
Figure 4:
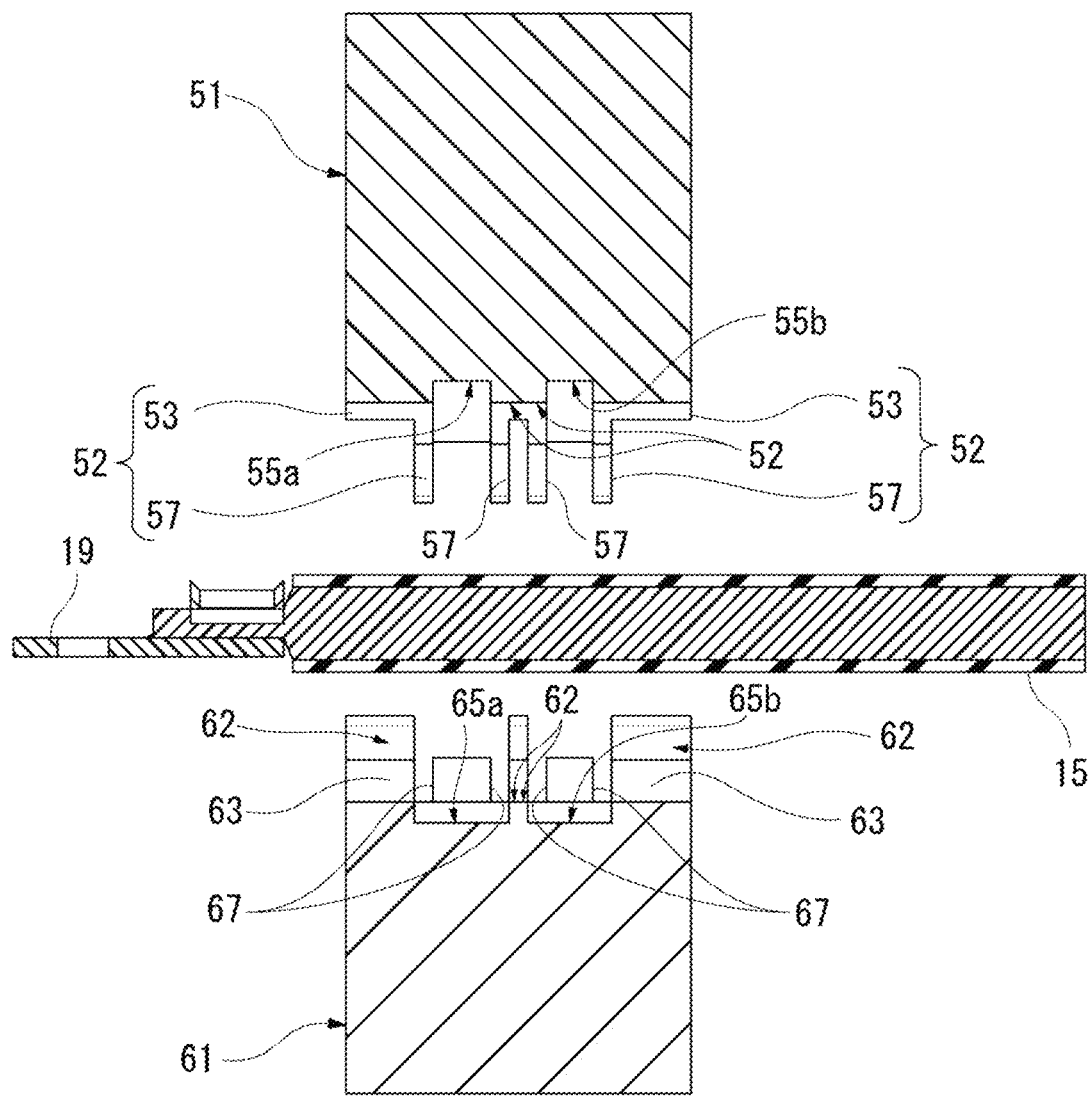
FIG. 4 is a cross-sectional view taken along an extending direction of the coated electric wire in the pair of molds shown in FIG. 1.

Hereinafter, embodiments according to the present invention will be described with reference to the drawings. FIG. 1 is a perspective view showing an opened state/a mold open state of a pair of molds 51 and 61 used in a molding method of a waterproof member according to an embodiment of the present invention. FIGS. 2A and 2B are perspective views showing first and second mold division surfaces 51a and 61a of the pair of molds 51 and 61 shown in FIG. 1. FIG. 3 is a perspective view showing a state in which a coated electric wire 15 is set in the pair of molds 51 and 61 shown in FIG. 1. FIG. 4 is a cross-sectional view taken along an extending direction of the coated electric wire 15 in the pair of molds 51 and 61 shown in FIG. 1.

The pair of molds 51 and 61 according to the embodiment are molds for injection-molding a seal portion 25 and a burr cut portion 27 that are waterproof members surrounding a part of the coated electric wire 15 in the extending direction. The coated electric wire 15 according to the present embodiment is a coated electric wire applied to a so-called overmolded connector in which a part of a terminal 19 connected to a conductor 17 at an end portion and the end portion are covered with an insulating housing 13 (see FIG. 10B). The seal portion 25 and the burr cut portion 27 are formed by injection molding using an insulating elastic member such as a thermoplastic elastomer.

As shown in FIGS. 1 to 4, the mold 51 (first mold) according to the embodiment is a movable mold having a first mold division surface 51a, and the mold 61 (second mold) is a fixed mold having a second mold division surface 61a. The first mold division surface 51a according to the embodiment is formed with a molding portion 55a and a molding portion 55b for injection molding the seal portion 25 and the burr cut portion 27, and four electric wire mold clamping portions 52 that is configured to, when the coated electric wire 15 is set between the molds 51, 61 and the mold 51 is attached to the mold 61, hold/sandwich an outer peripheral surface of the coated electric wire 15 at both sides of each of the molding portions 55a and 55b in the extending direction of the coated electric wire 15.

Each of the electric wire mold clamping portions 52 includes a convex portion 53 (first convex portion) having a semi-cylindrical concave surface 54 (first semi-cylindrical concave surface) that comes into contact with an outer peripheral surface of the coated electric wire 15, and side walls 57 erected on an end of the convex portion 53 in the extending direction of the coated electric wire 15. The end of the convex portion 53 is the one which is connected/adjacent to the molding portions 55a, 55b. The semi-cylindrical concave surface 54 of the convex portion 53 is a concave surface that has an arc cross section having a radius of curvature substantially the same as a radius of curvature of the coated electric wire 15 and having a central angle less than 180 degrees. Two electric wire clamping portions 52 positioned in the middle of the mold 51 in the extending direction have an integrated structure in which the semi-cylindrical concave surfaces 54 of respective convex portions 53 are continuous with the two electric wire clamping portions 52.

The second mold division surface 61a according to the embodiment is formed with a molding portion 65a and a molding portion 65b (second molding portion) for injection molding the seal portion 25 and the burr cut portion 27, and four electric wire mold clamping portions 62 configured to, when the coated electric wire 15 is set between the molds 51, 61 and the mold 51 is attached to the mold 61, hold/sandwich the outer peripheral surface of the coated electric wire 15 at both sides of each of the molding portions 65a and 65b in the extending direction of the coated electric wire 15.

Each of the electric wire mold clamping portions 62 includes a concave portion 63 to face the convex portion 53 and a side wall entering groove 67 to face the side wall 57. The concave portion 63 has a U-shaped cross section and includes a semi-cylindrical concave surface 64 (second semi-cylindrical concave surface) that comes into contact with the outer peripheral surface of the coated electric wire 15. The side wall entering groove 67 is formed by cutting out a part of the molding portion 65a or the molding portion 65b, and configured such that the side wall 57 can be inserted into the side wall entering groove 67. The semi-cylindrical concave surface 64 of the concave portion 63 is formed continuously with a pair of parallel surfaces at opening end sides of the concave portion 63. The semi-cylindrical concave surface 64 is a concave surface having an arc cross section whose radius of curvature is substantially the same as the radius of curvature of the coated electric wire 15. When the radius of curvature of the semi-cylindrical concave surface 64 is slightly smaller than the radius of curvature of the coated electric wire 15, as shown in FIG. 3, a coating of the coated electric wire 15 accommodated in the concave portion 63 can be elastically deformed and pressed, and a gap between the coated electric wire 15 and an adjacent electric wire mold clamping portion 62 can be eliminated. Two electric wire clamping portions 62 positioned in the middle of the mold 61 in the extending direction have an integrated structure in which the semi-cylindrical concave surfaces 64 of respective concave portions 63 are continuous with the two electric wire clamping portions 62.

Figure 5A:
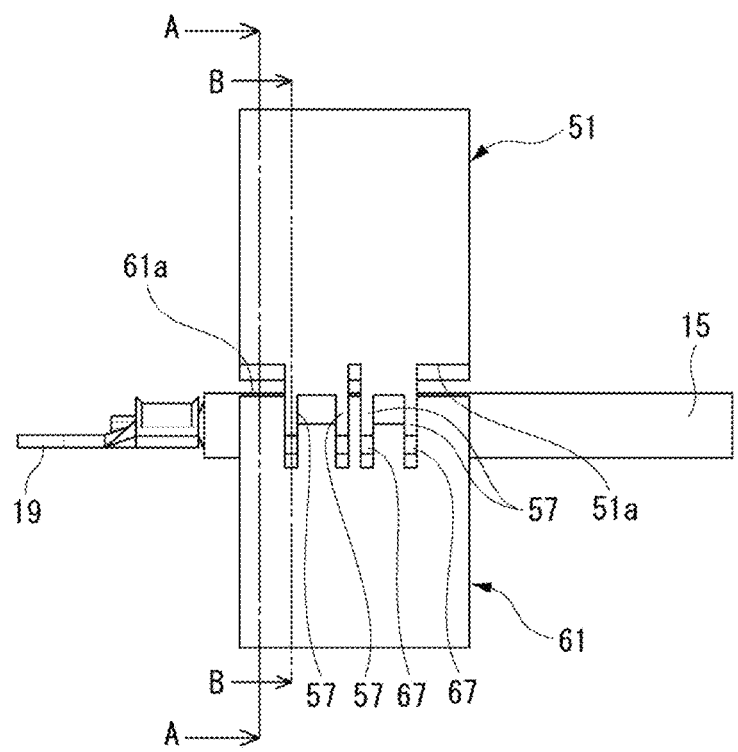
FIG. 5A is a side view showing the pair of molds during a course of mold clamping.
Figure 5B:
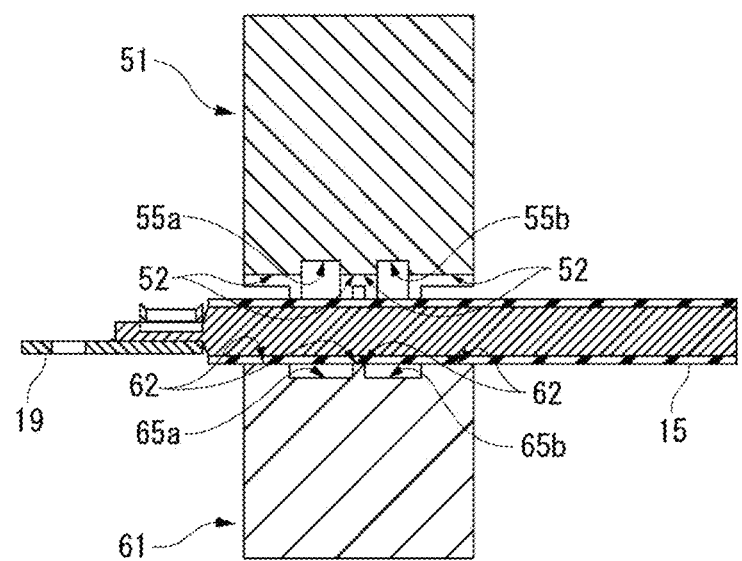
FIG. 5B is a cross-sectional view taken along the extending direction of the coated electric wire in FIG. 5A.
Figure 6A:
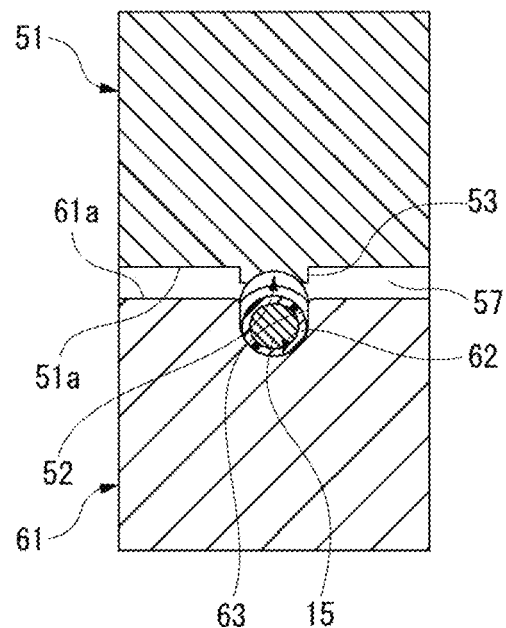
FIG. 6A is a cross-sectional view taken along a line A-A in FIG. 5A.
Figure 6B:
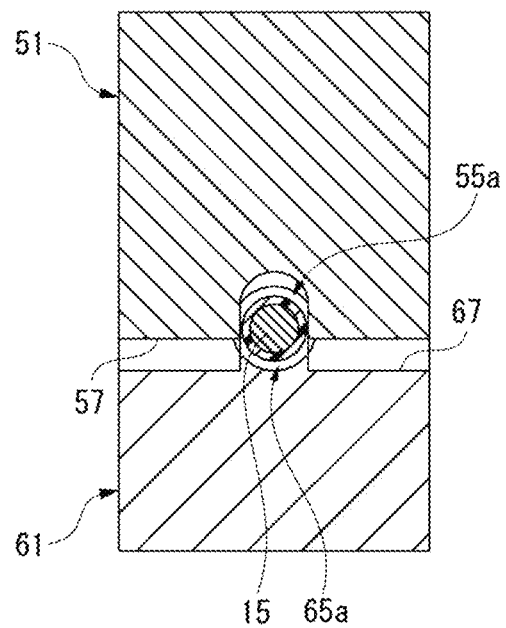
FIG. 6B is a cross-sectional view taken along a line B-B in FIG. 5A.
Figure 7A:
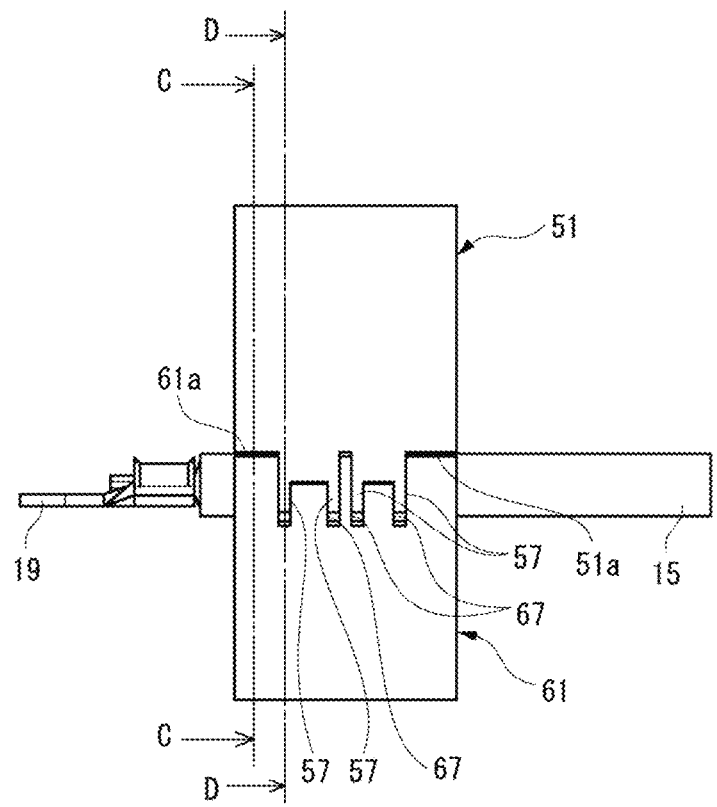
FIG. 7A is a side view showing the pair of molds in a mold clamped state.
Figure 7B:
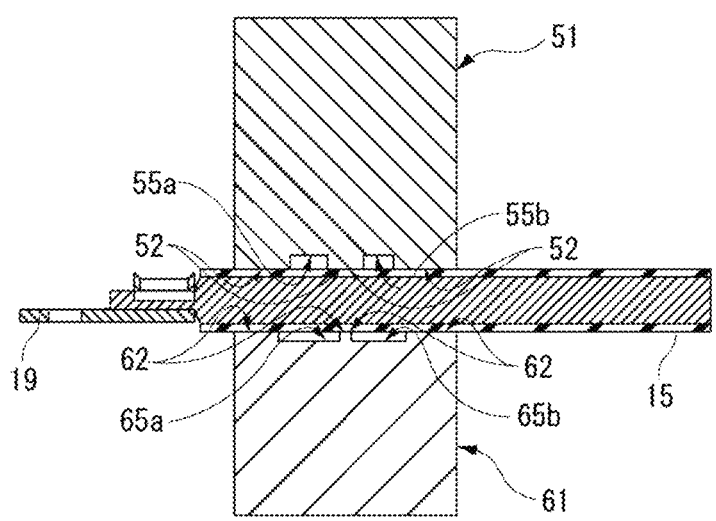
FIG. 7B is a cross-sectional view taken along the extending direction of the coated electric wire in FIG. 7A.
Figure 8A:
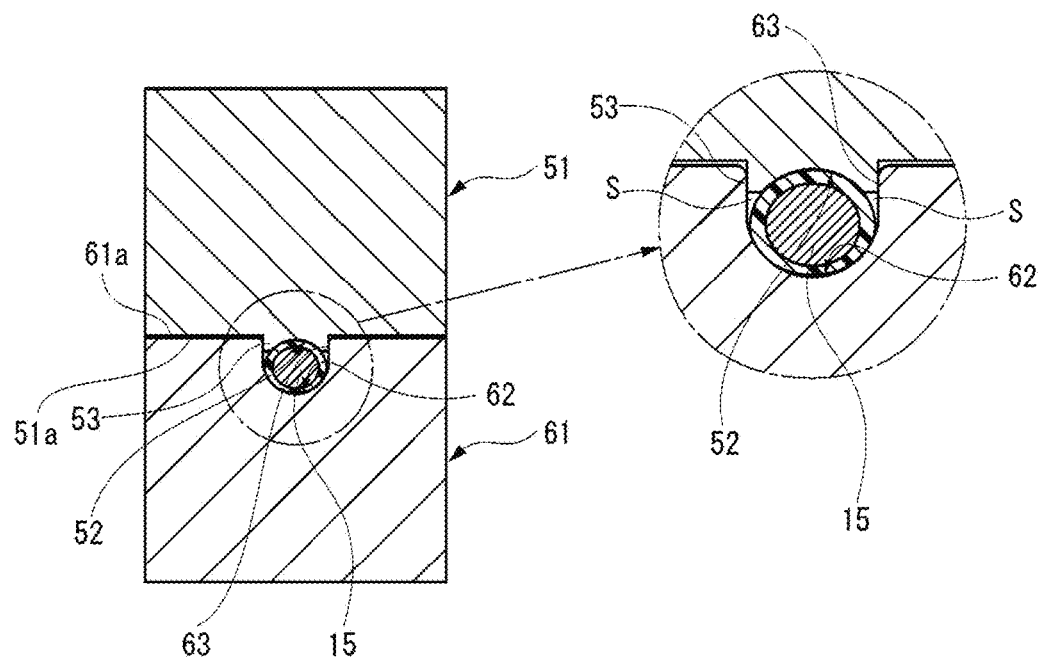
FIG. 8A is a cross-sectional view taken along a line C-C in FIG. 7A.
Figure 8B:
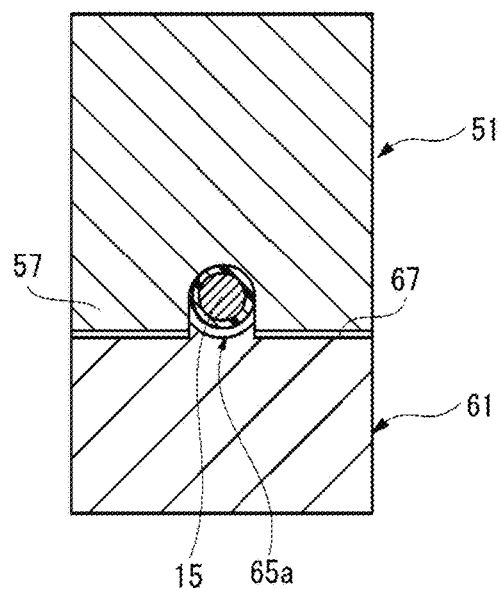
FIG. 8B is a cross-sectional view taken along a line D-D in FIG. 7A.
Figure 9:
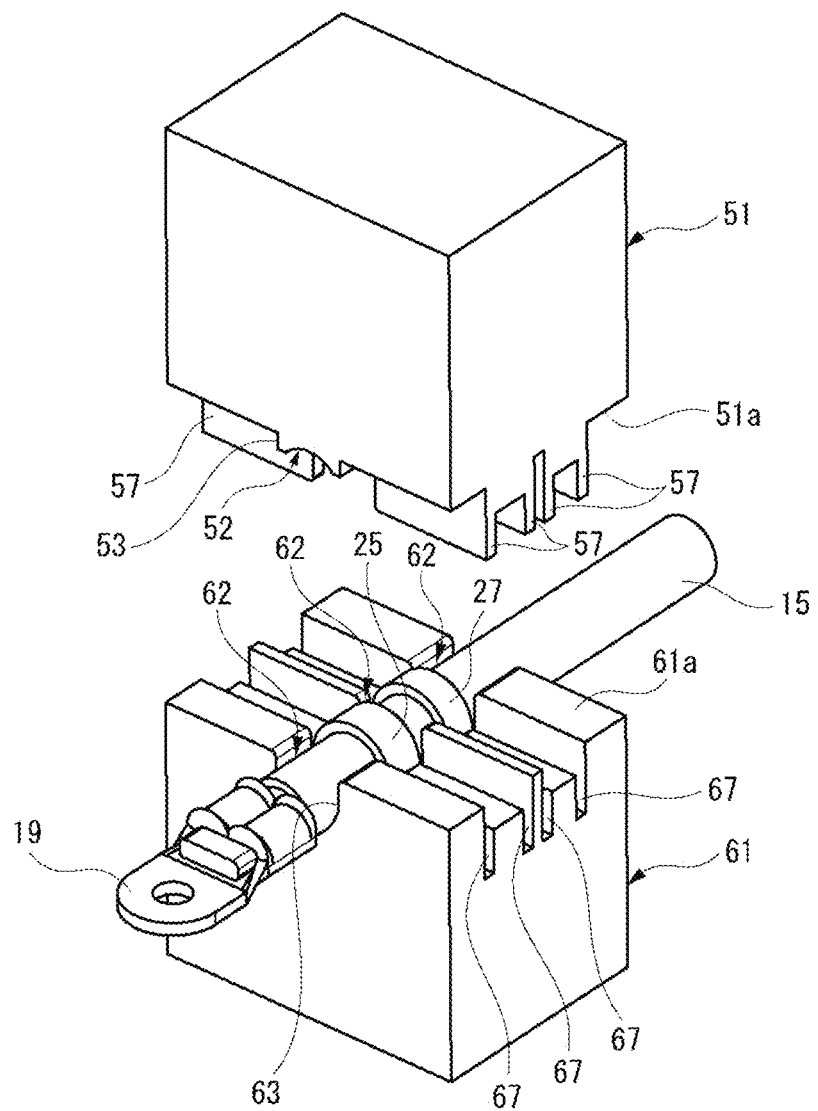
FIG. 9 is a perspective view showing the opened state of the pair of molds after a waterproof member is molded at a part of the coated electric wire.

Next, a molding method of a waterproof member for injection molding the seal portion 25 and the burr cut portion 27 surrounding a part of the coated electric wire 15 in the extending direction by using the pair of molds 51 and 61 according to the embodiment will be described. FIG. 5A is a side view showing the pair of molds 51 and 61 during a course of mold clamping, and FIG. 5B is a cross-sectional view taken along the extending direction of the coated electric wire 15 in FIG. 5A. FIG. 6A is a cross-sectional view taken along a line A-A in FIG. 5A, and FIG. 6B is a cross-sectional view taken along a line B-B in FIG. 5A. FIG. 7A is a side view showing the pair of molds 51 and 61 in a mold clamped state, and FIG. 7B is a cross-sectional view taken along the extending direction of the coated electric wire 15 in FIG. 7A. FIG. 8A is a cross-sectional view taken along a line C-C in FIG. 7A, and FIG. 8B is a cross-sectional view taken along a line D-D in FIG. 7A. FIG. 9 is a perspective view showing a mold open state of the pair of molds 51 and 61 after the seal portion 25 and the burr cut portion 27 are molded at a part of the coated electric wire 15.

First, as shown in FIGS. 3 and 4, the coated electric wire 15 is disposed between the mold 51 and the mold 61, and a part of the coated electric wire 15 in the extending direction is accommodated in the concave portion 63 of the electric wire mold clamping portion 62 formed on the second mold division surface 61*a* of the mold 61.

Next, as shown in FIGS. 5A, 5B, 6A, and 6B, the mold 51 is moved toward the mold 61. When the mold 51 is moved toward the mold 61, the molding portions 55*a* and 55*b* and the electric wire mold clamping portion 52 that are formed on the first mold division surface 51*a* respectively face the molding portions 65*a* and 65*b* and the electric wire mold clamping portion 62 that are formed on the second mold division surface 61*a*.

Then, as shown in FIGS. 7A, 7B, 8A, and 8B, when the pair of molds 51 and 61 are aligned so as to sandwich the coated electric wire 15 in parallel by the electric wire mold clamping portions 52 and 62 formed at the both sides of the respective molding portions 55*a*, 55*b*, 65*a*, and 65*b* along the extending direction of the coated electric wire 15, and the pair of molds 51 and 61 is clamped, molding spaces serving as cavities capable of molding the seal portion 25 and the burr cut portion 27 are respectively defined between the molding portions 55*a* and 55*b* and the outer peripheral surface of the coated electric wire 15, and between the molding portions 65*a* and 65*b* and the outer peripheral surface of the coated electric wire 15 (mold clamping step).

Then, the coated electric wire 15 accommodated in the concave portion 63 having a U-shaped cross section and including the semi-cylindrical concave surface 64 in the electric wire mold clamping portion 62 is pressed and biased in a clamping direction (a first direction) by the convex portion 53 including the semi-cylindrical concave surface 54. The clamping direction is a direction in which the mold 51 is attached to the mold 61. That is, the coated electric wire 15 accommodated in the concave portion 63 having a depth larger than a diameter of the coated electric wire 15 is interposed between the semi-cylindrical concave surface 64 of the concave portion 63 and the semi-cylindrical concave surface 54 of the convex portion 53. Therefore, the coated electric wire 15 is easily disposed in the electric wire mold clamping portion 62, and is less likely to be caught at the time of mold clamping.

In addition, as shown in FIGS. 8A and 8B, side walls 57 respectively erected on the ends of the convex portions 53, the ends being adjacent to/connected to the molding portions 55*a*, 55*b*, in the extending direction of the coated electric wire 15 are inserted into the side wall entering grooves 67 each formed by cutting out a part of the molding portion 65*a* or the molding portion 65*b*, so that gaps S generated among the coated electric wire 15, the concave portion 63 in the electric wire mold clamping portion 62, and the convex portion 53 are prevented from communicating with the molding portions 55*a* and 65*a* or communicating with the molding portions 55*b* and 65*b*.

Therefore, when a molten resin is injected into the molding spaces between the molding portions 55*a* and 65*a* and between the molding portions 55*b* and 65*b* from an injection gate (not shown), the molten resin that entered the molding spaces does not leak out from the gaps S formed among the concave portion 63, the convex portion 53, and the coated electric wire 15. Therefore, as shown in FIG. 8A, it is not necessary to provide sharp burr cut portions at two end portions (end portions in a left-right direction in FIG. 8A) of the semi-cylindrical concave surface 54 of the convex portion 53 in order to bring the semi-cylindrical concave surface 54 of the convex portion 53 into close contact with the outer periphery of the coated electric wire 15. Therefore, when the convex portion 53 presses and biases the coated electric wire 15, the coating of the coated electric wire 15 is less likely to be damaged. Then, after the molten resin that entered the molding spaces is solidified, as shown in FIG. 9, the mold 51 is retracted and separated from the mold 61, and then the coated electric wire 15 is taken out from the mold 61.

Figure 10A:
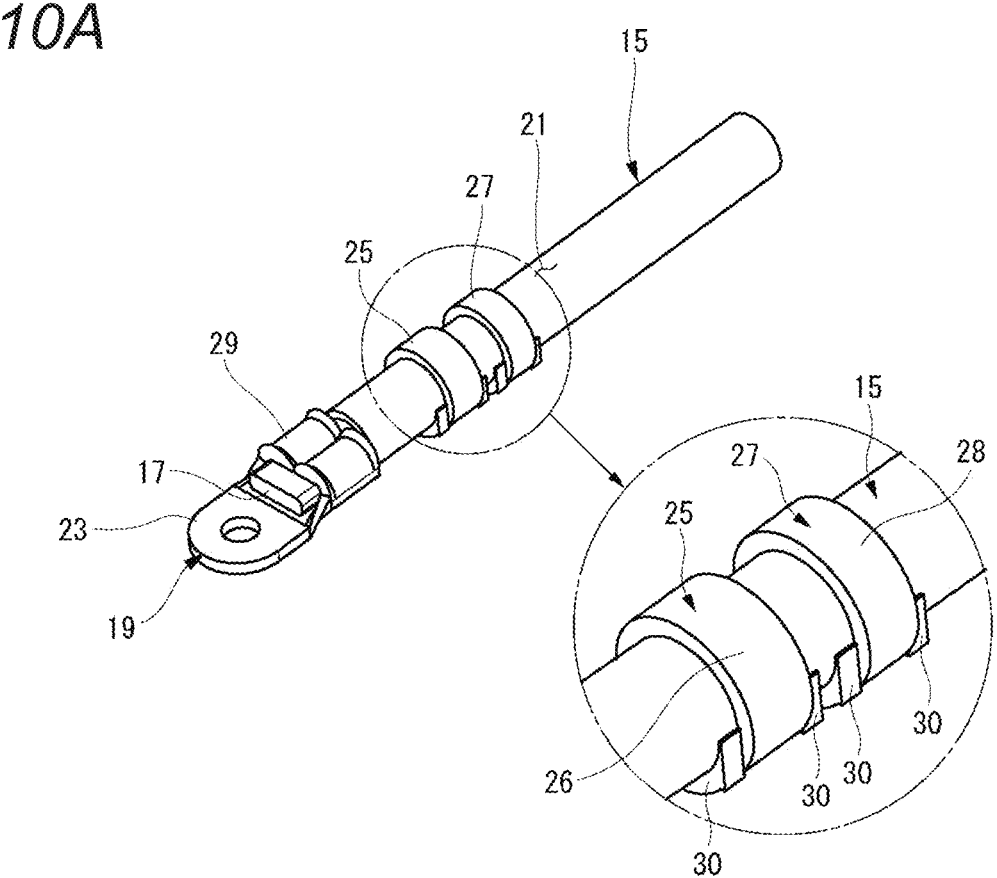
FIG. 10A is a perspective view showing the coated electric wire on which the waterproof member is formed at a part of the coated electric wire in the extending direction.
Figure 10B:
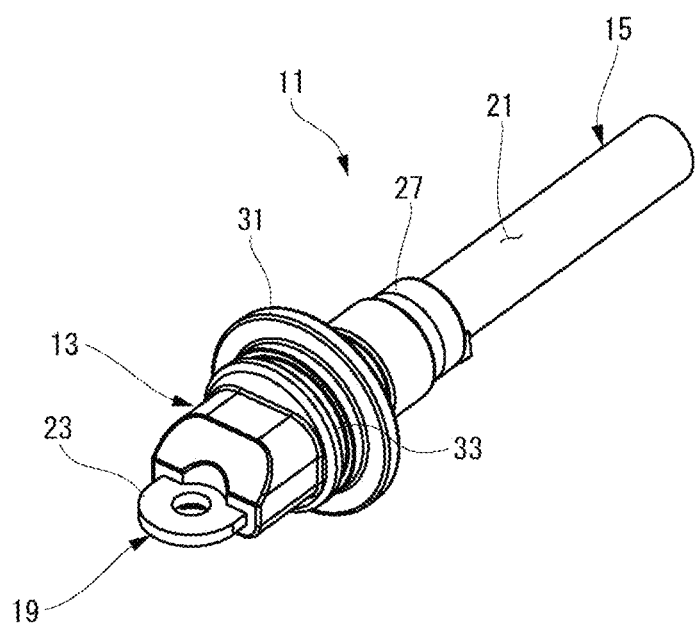
FIG. 10B is a perspective view showing a connector in which a housing is formed on the coated electric wire in FIG. 10A by secondary molding.
Figure 11A:
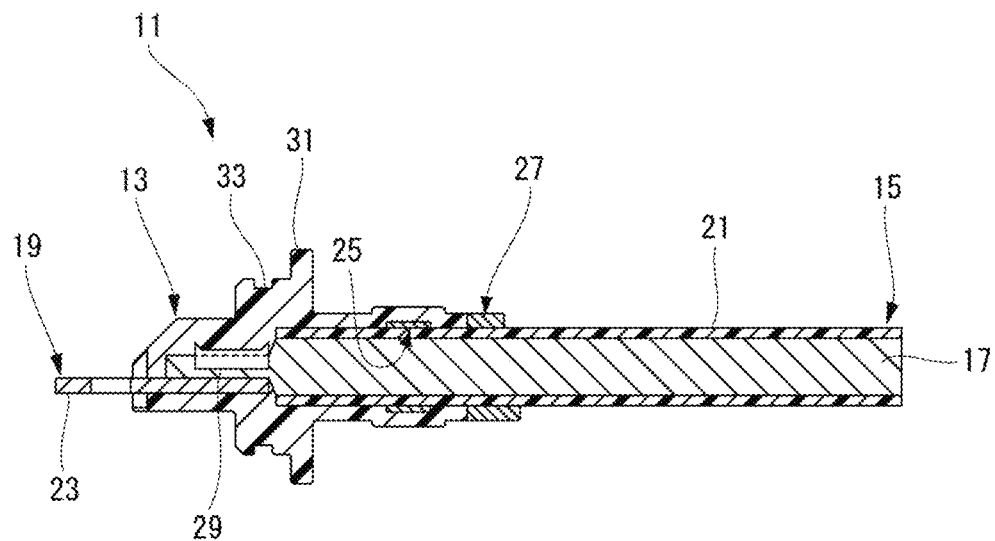
FIG. 11A is a longitudinal sectional view showing the connector shown in FIG. 10B.
Figure 11B:
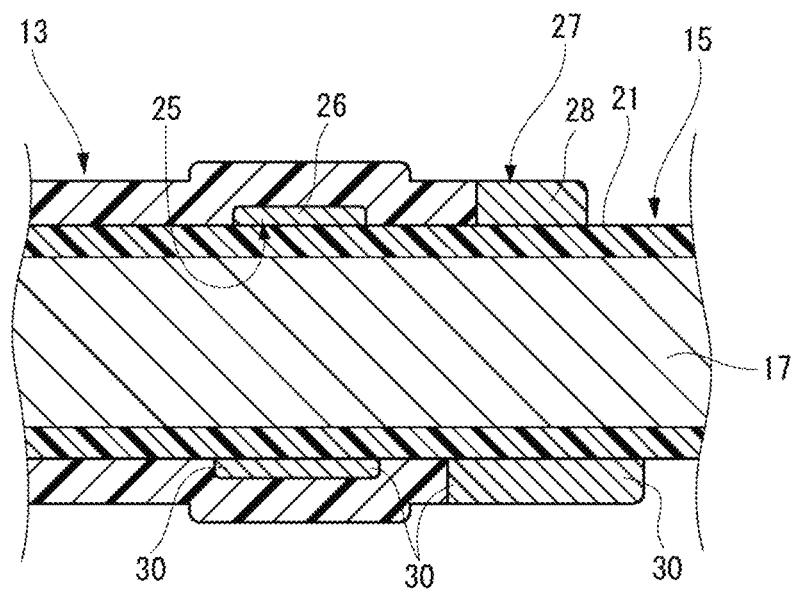
FIG. 11B is an enlarged view showing a main part of the waterproof member.

FIG. 10A is a perspective view showing the coated electric wire 15 on which the seal portion 25 and the burr cut portion 27 are formed at a part of the coated electric wire 15 in the extending direction, and FIG. 10B is a perspective view showing a connector 11 in which the housing 13 is formed on the coated electric wire 15 in FIG. 10A by secondary molding. FIG. 11A is a longitudinal cross-sectional view showing the connector 11 shown in FIG. 10B, and FIG. 11B is an enlarged view showing main parts of the seal portion 25 and the burr cut portion 27.

As shown in FIG. 10A, the seal portion 25 and the burr cut portion 27 are formed on the outer peripheral surface of the coated electric wire 15, which was taken out from the mold 16, such that the seal portion 25 and the burr cut portion 27 partially surround the coated electric wire 15 in the extending direction. The seal portion 25 includes a cylindrical portion 26 that covers an outer peripheral surface of the coating of the coated electric wire 15, and bulging portions 30 that protrude from two end portions of the cylindrical portion 26 toward an axial direction of the cylindrical portion 26. The bulging portion 30 is a portion where the molten resin flows into a molding space defined by a part of the side wall 57 inserted into the side wall entering groove 67 and a part of the molding portion 65*a* and the molten resin is solidified. The bulging portion 30 is unique to the seal portion 25 that is injection-molded using the pair of molds 51 and 61 according to the embodiment. Similar to the seal portion 25, the burr cut portion 27 also includes a cylindrical portion 28 that covers the outer peripheral surface of the coating of the coated electric wire 15, and bulging portions 30 that protrude from two end portions of the cylindrical portion 28 toward the axial direction of the cylindrical portion 28.

As shown in FIG. 10B, the coated electric wire 15 on which the seal portion 25 and the burr cut portion 27 surrounding a part of the coated electric wire 15 in the extending direction are primarily molded is applied to the connector 11 in which the seal portion 25 and a part of the terminal 19 at an end portion are secondarily molded as the housing 13 using an insulating resin such as a thermoplastic resin. At this time, the burr cut portion 27 is formed continuously with one end portion of the housing 13.

As shown in FIG. 11A, in the connector 11, the terminal 19 is conductively connected to the conductor 17 at an end portion of the coated electric wire 15. A connection portion 29 between the terminal 19 and the conductor 17 is covered with the housing 13. An electrical contact portion 23 of the terminal which is at an opposite side of the connection portion 29 protrudes to the outside of the housing 13.

The housing 13 is formed of an insulating resin (for example, PBT) having higher rigidity than an elastic material used for the seal portion 25 and the burr cut portion 27. The housing 13 integrally covers the seal portion 25 at an end portion of the coated electric wire 15 and the connection portion 29 of the terminal 19. The housing 13 covers the entirety of the seal portion 25. The housing 13 has a flange portion 31 that protrudes outward in a radial direction at a substantially central portion of the housing 13 in a direction along the coated electric wire 15. The flange portion 31 serves as a contact portion to be brought into contact with an attachment portion having an attachment hole. A peripheral groove 33 is formed on an outer periphery of the housing 13 further on a terminal side relative to the flange portion 31. An annular elastic seal member (not shown) is mounted in the peripheral groove 33.

As shown in FIG. 11B, the seal portion 25 and the burr cut portion 27 that are primarily molded are separated from each other by a predetermined distance. The seal portion 25 and the burr cut portion 27 are annular bodies having different outer diameters and are in close contact with the outer peripheral surface of the coating 21. In the embodiment, an outer diameter of the burr cut portion 27 is formed to be larger than an outer diameter of the seal portion 25. The burr cut portion 27 serves as contact portion against burrs and cuttings formed in a mold, and also functions as a second seal portion that seals the housing 13 and the coating 21 in a watertight manner.

In secondary molding using an injection molding machine, when the molten resin is injected in a pressed manner into a cavity of a mold at the time of molding the housing 13, it is necessary to prevent generation of burrs due to leakage of the molten resin. The burr cut portion 27 serves as a contact portion for this purpose. Burrs and cuttings form a plurality of sharp tip shaped portions arranged like mountains that may contact/sandwich the coated electric wire 15. Therefore, in a case where the housing 13 is directly formed on the outer peripheral surface of the coated electric wire 15, the coating 21 may be damaged when the coated electric wire 15 is disposed in the mold. In the connector 11, since burrs and cuttings provided in the mold used in the secondary molding come into contact with an outer periphery of the burr cut portion 27 formed by primary molding, the coating of the coated electric wire 15 is not damaged due to the burrs and cuttings.

Therefore, according to the molding method of a waterproof member in the embodiment, it is possible to prevent deterioration of a waterproof function due to poor external appearance of the coated electric wire 15 and damage or breakage of the coating of the coated electric wire 15.

Figure 12:
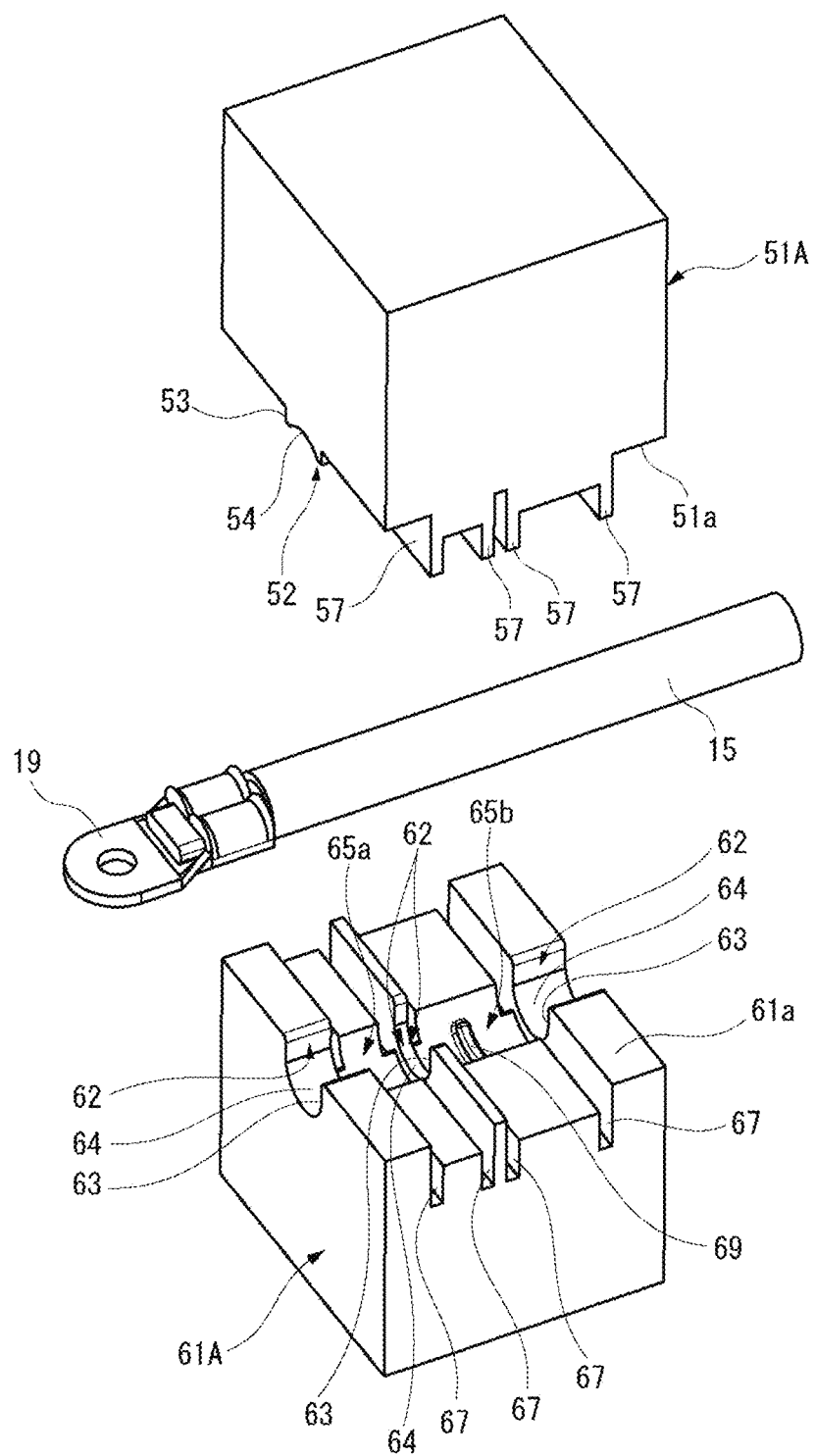
FIG. 12 is a perspective view showing an opened state of a pair of molds used in a molding method of a waterproof member according to another embodiment of the present invention.

FIG. 12 is a perspective view showing a mold open state of a pair of molds 51A and 61A used in a molding method of a waterproof member according to another embodiment of the present invention. FIG. 13 is a perspective view showing first and second mold division surfaces 51*a* and 61*a* of the pair of molds 51A and 61A shown in FIG. 12. FIGS. 14A and 14B are cross-sectional views taken along the extending direction of the coated electric wire 15 in the pair of molds 51A and 61A shown in FIG. 12, in which FIG. 14A shows a mold open state and 14B shows a mold clamped state. Components the same as those of the molds 51 and 61 according to the embodiment are denoted by the same reference numerals, and a description thereof will be omitted.

As shown in FIGS. 12 and 13, an electric wire deformation preventing portion 59 configured to restrict bending of the coated electric wire 15 along the extending direction is provided in a protruding manner on an inner surface of the molding portion 55*b* in the mold 51A according to the another embodiment. In addition, an electric wire deformation preventing portion 69 configured to restrict bending of the coated electric wire 15 along the extending direction is provided in a protruding manner on an inner surface of the molding portion 65*b* in the mold 61A.

When the pair of molds 51A and 61A according to the another embodiment is used to injection-mold the seal portion 25 and the burr cut portion 27A that surround a part of the coated electric wire 15 in the extending direction, the coated electric wire 15 is disposed between the mold 51A and the mold 61A as shown in FIG. 14A, and then the mold 51A and the mold 61A are clamped as shown in FIG. 14B.

At this time, the molding portion 55*b* and the molding portion 65*b* that mold the burr cut portion 27A according to the another embodiment are made relatively longer along the extending direction of the coated electric wire 15 than the molding portion 55*b* and the molding portion 65*b* that mold the burr cut portion 27 according to the embodiment. Therefore, the coated electric wire 15 according to the another embodiment is likely to bend along the extending direction in the molding space defined by the molding portions 55*b* and 65*b*.

However, since the electric wire deformation preventing portions 59 and 69 are provided in a protruding manner respectively on inner surfaces of the molding portions 55*b* and 65*b*, as shown in FIG. 14B, it is possible to restrict the coated electric wire 15 from bending along the extending direction in the molding space defined by the molding portions 55*b* and 65*b*. Therefore, it is possible to prevent the occurrence of a portion of the burr cut portion 27A where a thickness of the burr cut portion 27A is reduced due to bending of the coated electric wire 15 along the extending direction in the molding space (i.e., the occurrence of short circuit), and prevent the occurrence of burrs caused by leakage of the molten resin from the gap generated in the electric wire clamping portions 52, 62.

Figure 15A:
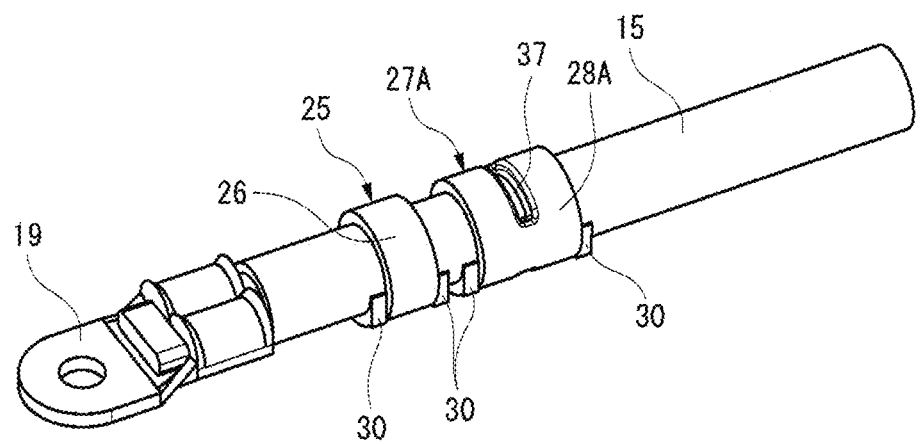
FIG. 15A is a perspective view and FIG. 15B is a side view showing the coated electric wire on which the waterproof member is formed at a part of the coated electric wire in the extending direction according to the another embodiment of the present invention.
Figure 15B:
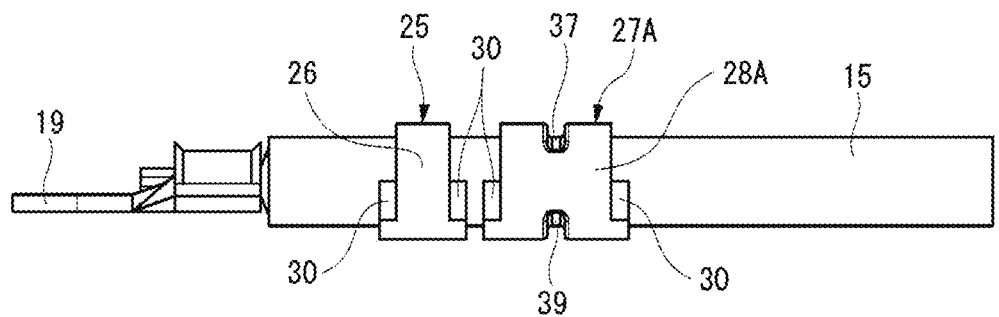

FIG. 15A is a perspective view and FIG. 15B is a side view showing the coated electric wire 15 on which the seal portion 25 and the burr cut portion 27 are formed at a part of the coated electric wire 15 in the extending direction according to the another embodiment of the present invention. As shown in FIGS. 15A and 15B, the seal portion 25 and the burr cut portion 27A that surround a part of the coated electric wire 15 in the extending direction are formed on the outer peripheral surface of the coated electric wire 15 that was taken out from the molds 51A and 61A. The burr cut portion 27A includes a pair of concave portions 37 and 39 on an outer peripheral surface of a cylindrical portion 28A that covers an outer peripheral surface of the coating of the coated electric wire 15. The concave portions 37 and 39 are portions formed by the electric wire deformation preventing portions 59 and 69 provided in a protruding manner respectively on the inner surfaces of the molding portions 55b and 65b, and the concave portions 37 and 39 are unique to the burr cut portion 27A injection-molded by the pair of molds 51A and 61A according to the another embodiment.

Therefore, according to the molding method of a waterproof member in the another embodiment, it is possible to prevent deterioration of a waterproof function due to poor external appearance of the coated electric wire 15 and damage or breakage of the coating of the coated electric wire 15.

Figure 16:
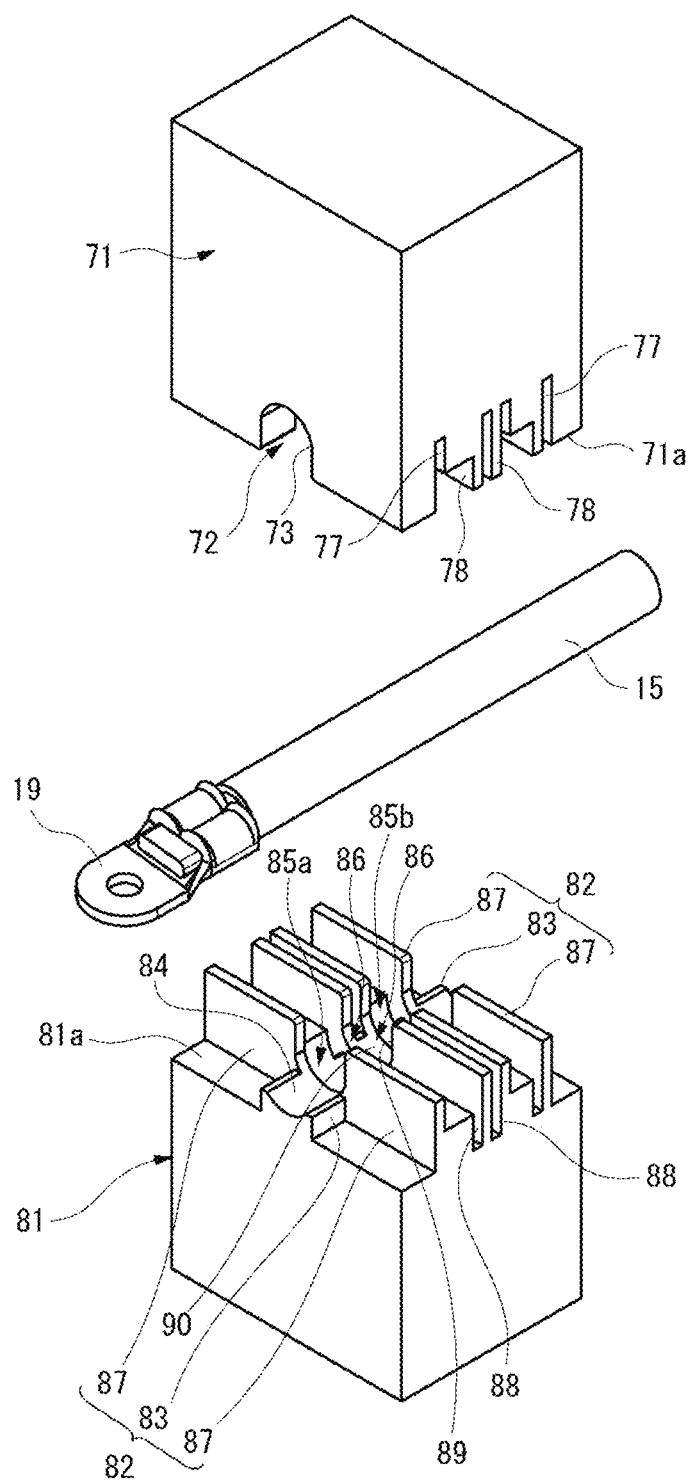
FIG. 16 is a perspective view showing an opened state of a pair of molds used in a molding method of a waterproof member according to a yet another embodiment of the present invention.
Figure 17:
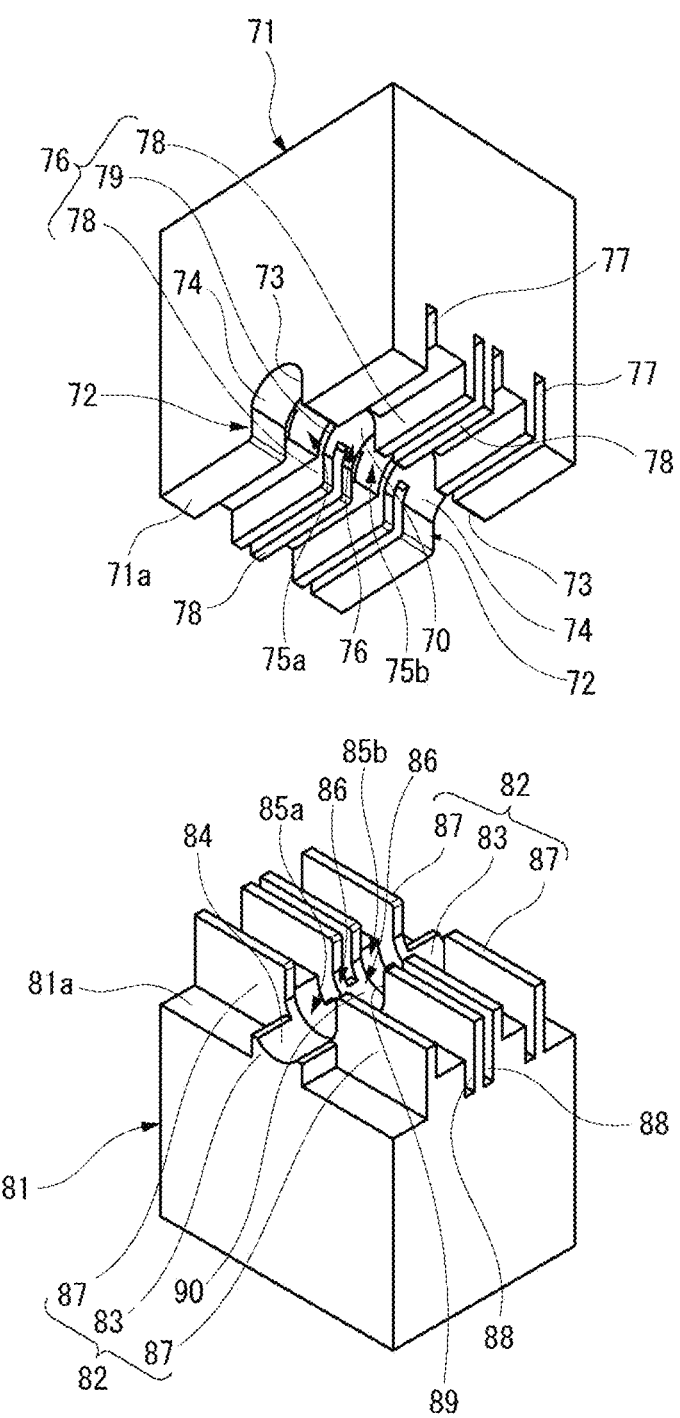
FIG. 17 is a perspective view showing first and second mold division surfaces of the pair of molds shown in FIG. 16.
Figure 18:
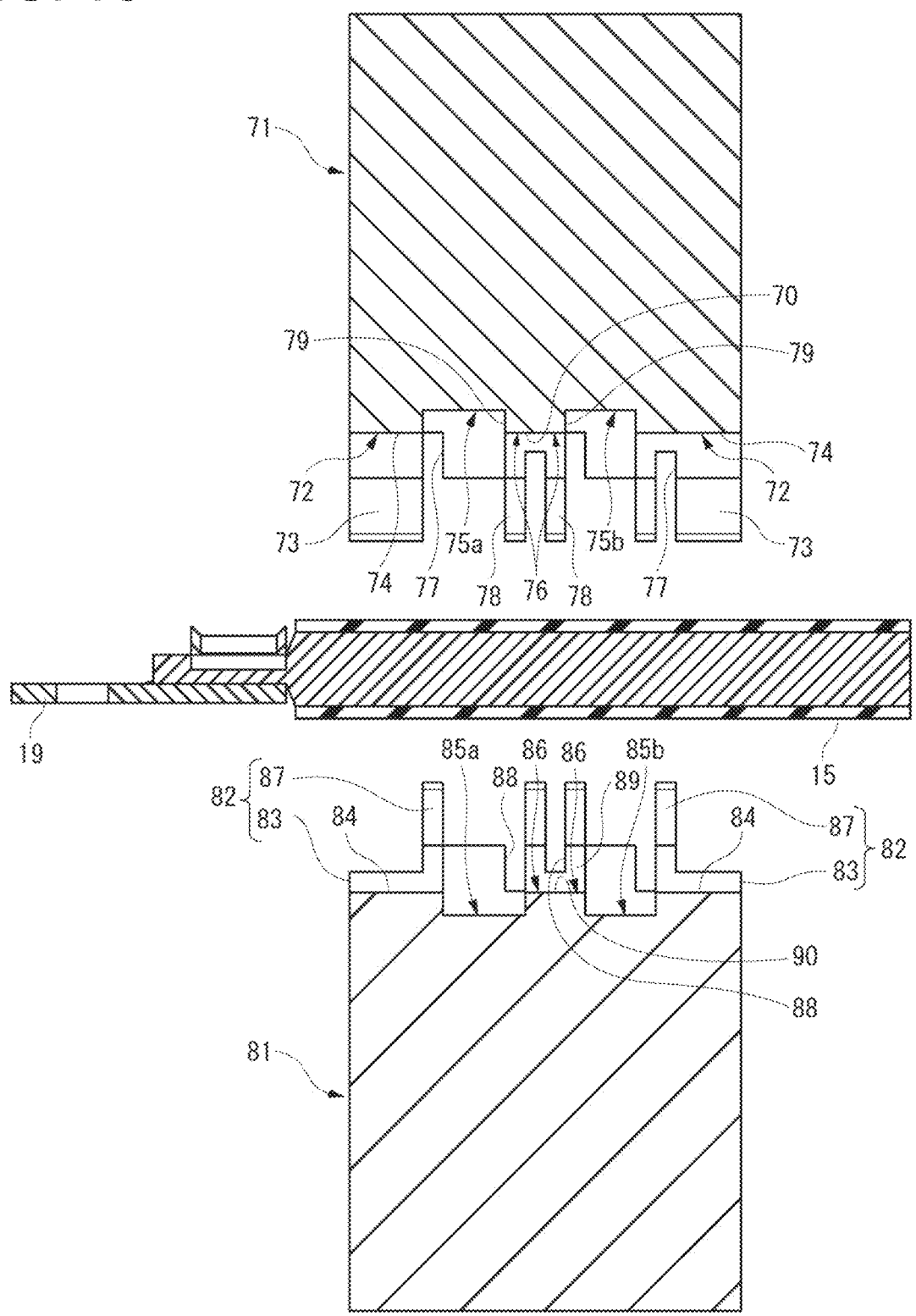
FIG. 18 is a cross-sectional view taken along the extending direction of the coated electric wire in the pair of molds shown in FIG. 16.
Figure 19:
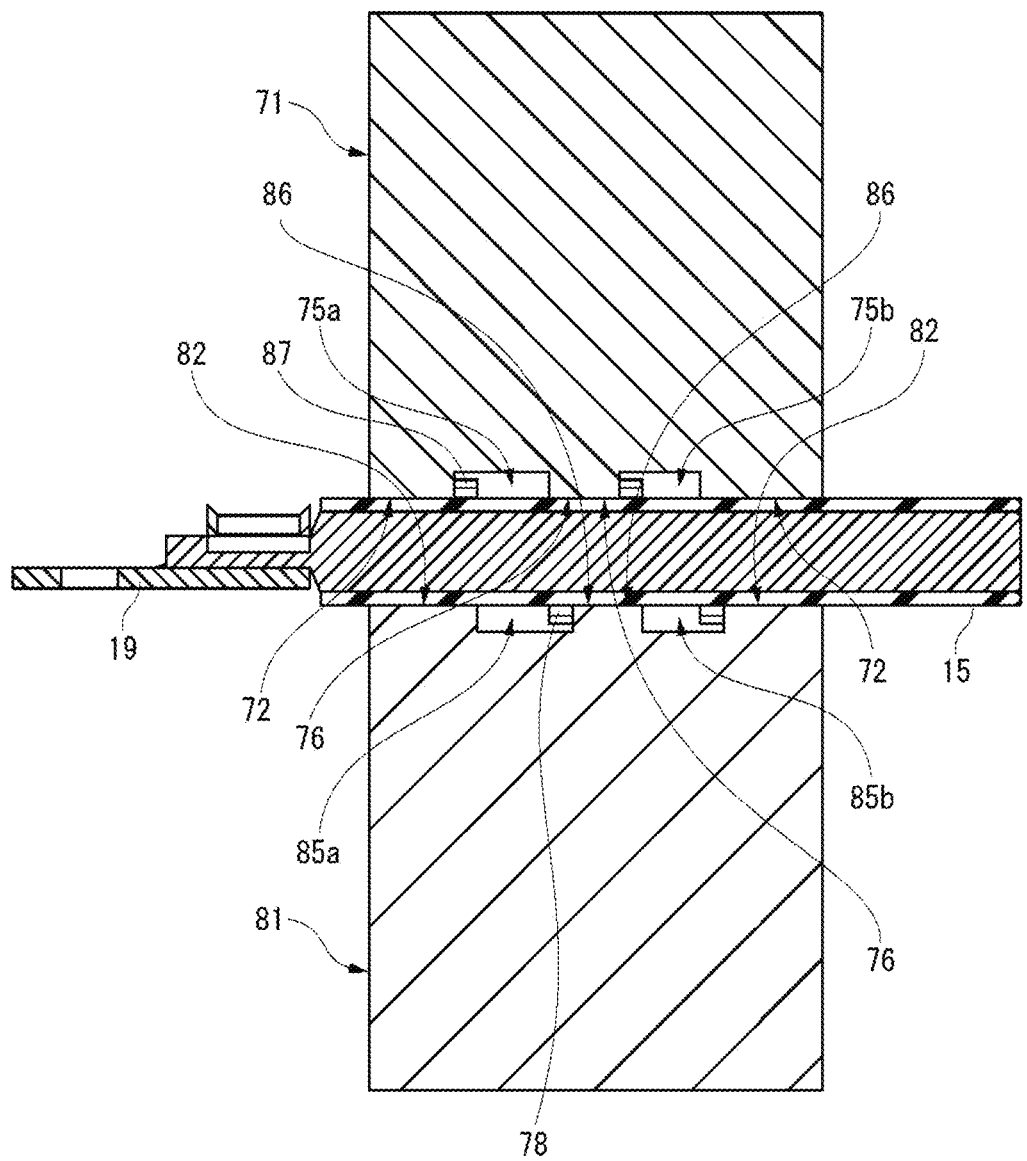
FIG. 19 is a cross-sectional view showing a mold clamped state of the pair of molds shown in FIG. 18.

FIG. 16 is a perspective view showing a mold open state of a pair of molds 71 and 81 used in a molding method of a waterproof member according to a yet another embodiment of the present invention. FIG. 17 is a perspective view showing first and second mold division surfaces 71a and 81a of the pair of molds 71 and 81 shown in FIG. 16. FIG. 18 is a cross-sectional view taken along the extending direction of the coated electric wire 15 in the pair of molds 71 and 81 shown in FIG. 16. FIG. 19 is a cross-sectional view showing a mold clamped state of the pair of molds 71 and 81 shown in FIG. 18. Components the same as those of the molds 51 and 61 according to the embodiment are denoted by the same reference numerals, and a description thereof will be omitted.

As shown in FIGS. 16 to 18, the mold 71 according to the yet another embodiment is a movable mold having the first mold division surface 71a, and the mold 81 is a fixed mold having the second mold division surface 81a. The first mold division surface 71a according to the yet another embodiment is formed with a molding portion 75a and a molding portion 75b for injection-molding a seal portion 25B and a burr cut portion 27B, and electric wire mold clamping portions 72 and electric wire mold clamping portions 76 configured to sandwich an outer peripheral surface of the coated electric wire 15 at both sides of each of the molding portions 75a and 75b in the extending direction of the coated electric wire 15.

The second mold division surface 81a according to the yet another embodiment is formed with a molding portion 85a and a molding portion 85b for injection-molding the seal portion 25B and the burr cut portion 27B, and electric wire mold clamping portions 82 and electric wire mold clamping portions 86 configured to sandwich the outer peripheral surface of the coated electric wire 15 at both sides of each of the molding portions 85a, and 85b in the extending direction of the coated electric wire 15.

Each of the electric wire mold clamping portions 76 of the first mold division surface 71a includes a convex portion 79 (first convex portion) having a semi-cylindrical concave surface 70 that comes into contact with an outer peripheral surface of the coated electric wire 15, and side walls 78 erected on ends of the convex portions 79 in the extending direction of the coated electric wire 15, the ends being connected to the molding portion 75a or the molding portion 75b. The semi-cylindrical concave surface 70 of the convex portion 79 is a concave surface that has an arc cross section having a radius of curvature substantially the same as a radius of curvature of the coated electric wire 15 and having a central angle less than 180 degrees. Two electric wire clamping portions 76 positioned in the middle of the mold 71 in the extending direction have an integrated structure in which the semi-cylindrical concave surfaces 70 of respective convex portions 79 are continuous with the two electric wire clamping portions 76.

Each of the electric wire mold clamping portions 86 of the second mold division surface 81a includes a concave portion 89 facing the convex portion 79, and a side wall entering groove 88 facing the side wall 78. The concave portion 89 (first concave portion) has a U-shaped cross section and includes a semi-cylindrical concave surface 90 that comes into contact with the outer peripheral surface of the coated electric wire 15. The side wall entering groove 88 is formed by cutting out a part of the molding portion 85a or the molding portion 85b, and the side wall 78 can be inserted into the side wall entering groove 88. The semi-cylindrical concave surface 90 of the concave portion 89 is formed continuously with a pair of parallel surfaces at opening end sides of the concave portion 89. The semi-cylindrical concave surface 90 is a concave surface having an arc cross section whose radius of curvature is substantially the same as the radius of curvature of the coated electric wire 15. Two electric wire clamping portions 86 positioned in the middle of the mold 81 in the extending direction have an integrated structure in which the semi-cylindrical concave surfaces 90 of respective concave portions 89 are continuous with the two electric wire clamping portions 86.

Each of the electric wire mold clamping portions 82 of the second mold division surface 81a includes a convex portion 83 (second convex portion) having a semi-cylindrical concave surface 84 that comes into contact with an outer peripheral surface of the coated electric wire 15, and side walls 87 erected on ends of the convex portions 83 in the extending direction of the coated electric wire 15, the ends being connected to the molding portion 85a or the molding portion 85b. The semi-cylindrical concave surface 84 of the convex portion 83 is a concave surface that has an arc cross section having a radius of curvature substantially the same as a radius of curvature of the coated electric wire 15 and having a central angle less than 180 degrees.

Each of the electric wire mold clamping portions 72 of the first mold division surface 71a includes a concave portion 73 (second concave portion) facing the convex portion 83, and a side wall entering groove 77 facing the side wall 87. The concave portion 73 has a U-shaped cross section and includes a semi-cylindrical concave surface 74 that comes into contact with the outer peripheral surface of the coated electric wire 15. The side wall entering groove 77 is formed by cutting out a part of the molding portion 75a or the molding portion 75b, and the side wall 87 can be inserted into the side wall entering groove 77. The semi-cylindrical concave surface 74 of the concave portion 73 is formed continuously with a pair of parallel surfaces at opening end sides of the concave portion 73. The semi-cylindrical concave surface 74 is a concave surface having an arc cross section whose radius of curvature is substantially the same as the radius of curvature of the coated electric wire 15.

That is, each convex portion 79 and each concave portion 73 are formed on both sides (first and second sides) of the molding portion 75a or the molding portion 75b on the first mold division surface 71a in the extending direction, and each concave portion 89 and each convex portion 83 are formed on two sides (first and second sides) of the molding portion 85a or the molding portion 85b on the second mold division surface 81a in the extending direction.

According to the pair of molds 71 and 81 used in the molding method of a waterproof member according to the yet another embodiment, the coated electric wire 15 is interposed between the electric wire mold clamping portions 72 and 82 and between the electric wire mold clamping portions 76 and 86 at both sides of the molding portions 75a, 85a or the molding portions 75b, 85b, and the coated electric wire 15 is pressed and biased in opposite directions at the two sides of the molding portions 75a, 85a or the molding portions 75b, 85b. In other words, the coated electric wire 15 is pressed toward the first direction at the first sides of the molding portions 75a, 75b, 85a, 85b and toward a second direction opposite to the first direction at the second sides of the molding portions 75a, 75b, 85a, 85b, the second sides being opposite to the first sides in the extending direction of the coated electric wire 15. In this case, even when the molding portions 75a, 75b and the molding portions 85a, 85b are made relatively long in the extending direction of the coated electric wire 15, the coated electric wire 15 is less likely to bend along the extending direction in a molding space defined by the molding portions 75a, 85a or the molding portions 75b, 85b. Therefore, it is possible to prevent the occurrence of a portion of the seal portion 25B and a portion of the burr cut portion 27B where a thickness of seal portion 25B and a thickness of the burr cut portion 27A are reduced due to bending of the coated electric wire 15 along the extending direction in the molding space (i.e., occurrence of short circuit), and prevent the occurrence of burrs caused by leakage of the molten resin from the gap generated in the electric wire clamping portions 72 and 82 and the electric wire mold clamping portions 76 and 86.

Figure 20A:
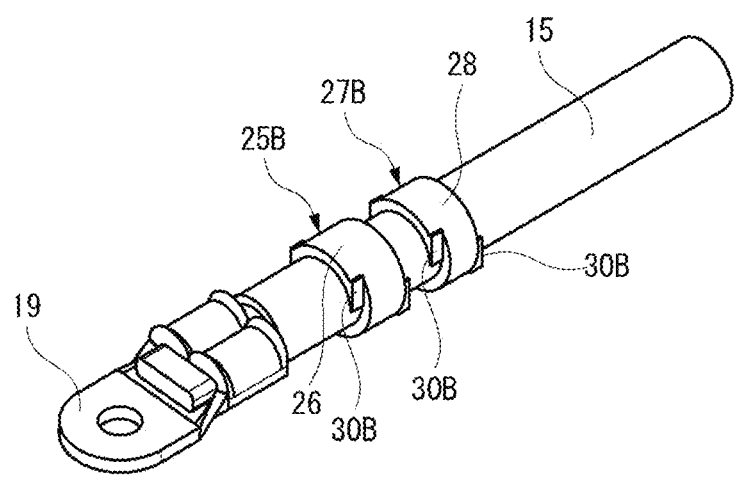
FIG. 20A is a perspective view and FIG. 20B is a side view showing the coated electric wire on which the waterproof member is formed at a part of the coated electric wire in the extending direction according to the yet another embodiment of the present invention.
Figure 20B:
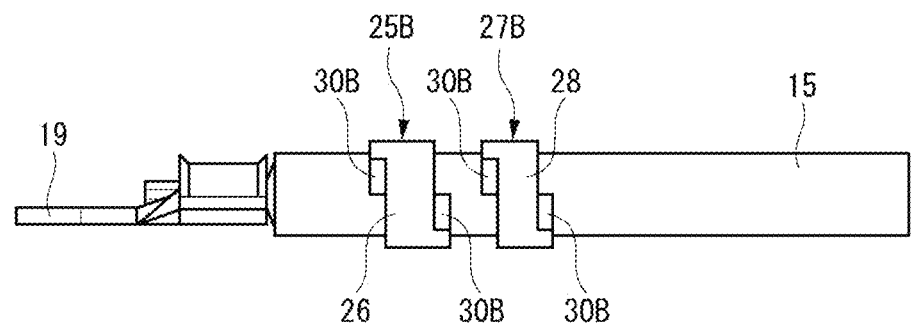

FIG. 20A is a perspective view and FIG. 20B is a side view showing the coated electric wire on which the seal portion 25B and the burr cut portion 27B are formed at a part of the coated electric wire 15 in the extending direction according to the yet another embodiment of the present invention. As shown in FIGS. 20A and 20B, the seal portion 25B and the burr cut portion 27B that surround a part of the coated electric wire 15 in the extending direction are formed on the outer peripheral surface of the coated electric wire 15 that was taken out from the molds 71 and 81.

The seal portion 25B includes the cylindrical portion 26 that covers an outer peripheral surface of the coating of the coated electric wire 15, and bulging portions 30B that protrude from two end portions of the cylindrical portion 26 toward an axial direction. The bulging portion 30B is a portion where the molten resin flows into a molding space defined by a part of the side walls 87 and 78 inserted into the side wall entering grooves 77 and 88 and a part of the molding portions 75a, 75b, 85a, and 85b and the molten resin is solidified. The bulging portion 30B is unique to the seal portion 25B that is injection-molded using the pair of molds 71 and 81 according to the yet another embodiment.

Therefore, according to the molding method of a waterproof member in the yet another embodiment, it is possible to prevent deterioration of a waterproof function due to poor external appearance of the coated electric wire 15 and damage or breakage of the coating of the coated electric wire 15.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a molding method of a waterproof member is provided. The waterproof member (for example, the seal portion 25, the burr cut portion 27) is molded by a pair of molds (51, 61) and is configured to surround a part of a coated electric wire (15) in an extending direction of the coated electric wire (15) in which the coated electric wire (15) extends. The pair of molds (51, 61) includes a first mold (51) and a second mold (61) having a first mold division surface (51a) and a second mold division surface (61a), respectively. The first mold division surface (51a) includes a first molding portion (55a, 55b) and a first electric wire mold clamping portion (52) and the second mold division surface (61a) includes a second molding portion (65a, 65b) and a second electric wire mold clamping portion (62). The first and second molding portions (55a, 55b, 65a, 65b) are configured to mold the waterproof member (for example, the seal portion 25, the burr cut portion 27) when the waterproof member is injection-molded. The first and second electric wire mold clamping portions (52, 62) are configured to, when the first mold (51) is attached to the second mold (61) with the coated electric wire (15) being disposed between the first and second molds (51, 61), sandwich the coated electric wire (15) at both sides of each of the first and second molding portions (55a, 55b, 65a, 65b) in the extending direction of the coated electric wire (15). The first electric wire mold clamping portion (52) includes a first convex portion (53) having a first semi-cylindrical concave surface (54) configured to contact an outer peripheral surface of the coated electric wire (15) and a side wall (57) erected on an end of the first convex portion (53) in the extending direction of the coated electric wire (15), the end being connected to the first molding portion (55a, 55b). The second electric wire mold clamping portion (62) includes a first concave portion (63) including a second semi-cylindrical concave surface (64) configured to contact the outer peripheral surface of the coated electric wire (15) while being opposed to the first convex portion (53), the first concave portion (63) having a U-shaped cross section. The second molding portion (65a, 65b) includes a side wall entering groove (67) formed by cutting out a part of the second molding portion (65a, 65b), the side wall entering groove (67) being configured such that, when the first mold (51) attached to the second mold (61), the side wall (57) enters the side wall entering groove (67). The method includes molding the waterproof member (25, 27) accommodated in the first concave portion (63) with the waterproof member (25, 27) being pressed by the first convex portion (53) toward a first direction in which the first mold (51) is attached to the second mold (61).

According to the molding method of the waterproof member having the above described configuration, when the coated electric wire is disposed between the first and second mold division surfaces, the pair of molds are aligned so as to sandwich the coated electric wire in parallel by the electric wire mold clamping portions respectively formed at both sides of each of the molding portions in the extending direction of the coated electric wire, and the pair of molds are clamped, a molding portion for injection-molding the waterproof member is defined between the pair of molds. Then, the coated electric wire accommodated in the concave portion having a U-shaped cross section and including the semi-cylindrical concave surface in the electric wire mold clamping portion is pressed and biased in a clamping direction by the convex portion including the semi-cylindrical concave surface. That is, the coated electric wire is accommodated in the concave portion having a depth larger than a diameter of the coated electric wire and the coated electric wire is interposed between the semi-cylindrical concave surface of the concave portion and the semi-cylindrical concave surface of the convex portion. Therefore, the coated electric wire is easily disposed in the electric wire mold clamping portion and is less likely to be caught at the time of mold clamping. In addition, the side wall erected on an end of the convex portion in the extending direction of the coated electric wire, the end being connected to the molding portion is inserted into the side wall entering groove formed by cutting out a part of the molding portions, so that a gap generated among the coated electric wire, the concave portion and the convex portion in the electric wire mold clamping portion is prevented from communicating with the molding portions. Therefore, when the molten resin in the molding portions is injected out, the molten resin that entered the molding portions does not leak out from the gap formed among the concave portion, the convex portion, and the coated electric wire. Therefore, it is not necessary to provide slurped burr cut portions at two end portions of the semi-cylindrical concave surface of the convex portion in order to bring the semi-cylindrical concave surface of the convex portion into close contact with an outer periphery of the coated electric wire. Therefore, when the convex portion presses and biases the coated electric wire, the coating of the coated electric wire is less likely to be damaged.

An electric wire deformation preventing portion (59, 69) may be provided in a protruding manner on an inner surface of at least one of the first and second molding portions (55*b*, 65*b*), the electric wire deformation preventing portion (59, 69) being configured to restrict bending of the coated electric wire (15) in the first and second molding portions (55*b*, 65*b*).

With this configuration, when the molding portion is made relatively long in the extending direction of the coated electric wire, since the electric wire deformation preventing portion is provided in a protruding manner on the inner surface of the molding portions, it is possible to prevent the coated electric wire from being bent in/inside the molding portion. Therefore, it is possible to prevent the occurrence of a portion of the waterproof member where a thickness of waterproof member is reduced due to bending of the coated electric wire along the extending direction in the molding portions (i.e., occurrence of short circuit), and prevent the occurrence of burrs caused by leakage of the molten resin from the gap generated in the electric wire clamping portion.

The first mold division surface (71*a*) may include the first convex portion (79) and a second concave portion (73) including a third semi-cylindrical concave surface configured to contact the outer peripheral surface of the coated electric wire (15) while being opposed to a second convex portion (83), the second concave portion (73) having a U-shaped cross section, the first convex portion (79) and the second concave portion (73) being provided on first and second sides of the first molding portion (75*a*, 75*b*) in the extending direction of the coated electric wire (15). The second mold division surface (81*a*) may include the first concave portion (89) and the second convex portion (83) having a fourth semi-cylindrical concave surface configured to contact the outer peripheral surface of the coated electric wire (15), the first concave portion (89) and the second convex portion (83) being provided on first and second sides of the second molding portion (85*a*, 85*b*) in the extending direction of the coated electric wire (15). The waterproof member (for example, the seal portion 25B, the burr cut portion 27B) may be molded while the coated electric wire (15) is pressed toward the first direction at the first sides of the first and second molding portions (75*a*, 75*b*, 85*a*, 85*b*) and toward a second direction opposite to the first direction at the second sides of the first and second molding portions (75*a*, 75*b*, 85*a*, 85*b*), the second sides being opposite to the first sides in the extending direction of the coated electric wire (15).

With this configuration, the coated electric wire interposed between the electric wire clamping portions at both (two) sides of each of the molding portions is pressed and biased in opposite clamping directions at the two sides of each of the molding portions. In this case, even when the molding portion is made relatively long along the extending direction of the coated electric wire, the coated electric wire is less likely to bend along the extending direction in the molding portions. Therefore, it is possible to prevent the occurrence of a portion of the waterproof member where a thickness of waterproof member is reduced due to bending of the coated electric wire along the extending direction in the molding portion (i.e., occurrence of short circuit), and prevent the occurrence of burrs caused by leakage of the molten resin from the gap generated in the electric wire clamping portion.

What is claimed is:
1. A molding method of a waterproof member,
   wherein the waterproof member is molded by a pair of molds and is configured to surround a part of a coated electric wire in an extending direction of the coated electric wire in which the coated electric wire extends,
   wherein the pair of molds includes a first mold and a second mold having a first mold division surface and a second mold division surface, respectively,
   wherein the first mold division surface includes: a first molding portion; and a first electric wire mold clamping portion and the second mold division surface includes: a second molding portion; and a second electric wire mold clamping portion,
   wherein the first and second molding portions are configured to mold the waterproof member when the waterproof member is injection-molded,
   wherein the first and second electric wire mold clamping portions are configured to, when the first mold is attached to the second mold with the coated electric wire being disposed between the first and second molds, sandwich the coated electric wire at both sides of each of the first and second molding portions in the extending direction of the coated electric wire,
   wherein the first electric wire mold clamping portion includes: a first convex portion having a first semi-cylindrical concave surface configured to contact an outer peripheral surface of the coated electric wire; and a side wall erected on an end of the first convex portion in the extending direction of the coated electric wire, the end being connected to the first molding portion,
   wherein the second electric wire mold clamping portion includes: a first concave portion including a second semi-cylindrical concave surface configured to contact the outer peripheral surface of the coated electric wire while being opposed to the first convex portion, the first concave portion having a U-shaped cross section;

wherein the second molding portion includes a side wall entering groove formed by cutting out a part of the second molding portion, the side wall entering groove being configured such that, when the first mold is attached to the second mold, the side wall enters the side wall entering groove, the method comprising:

molding the waterproof member accommodated in the first concave portion with the waterproof member being pressed by the first convex portion toward a first direction in which the first mold is attached to the second mold.

2. The method according to claim 1, wherein an electric wire deformation preventing portion is provided in a protruding manner on an inner surface of at least one of the first and second molding portions, the electric wire deformation preventing portion being configured to restrict bending of the coated electric wire in the first and second molding portions.

3. The method according to claim 1, wherein the first mold division surface includes: the first convex portion; and a second concave portion including a third semi-cylindrical concave surface configured to contact the outer peripheral surface of the coated electric wire while being opposed to a second convex portion, the second concave portion having a U-shaped cross section, the first convex portion and the second concave portion being provided on first and second sides of the first molding portion in the extending direction of the coated electric wire, wherein the second mold division surface includes: the first concave portion; and the second convex portion having a fourth semi-cylindrical concave surface configured to contact the outer peripheral surface of the coated electric wire, the first concave portion and the second convex portion being provided on first and second sides of the second molding portion in the extending direction of the coated electric wire, and wherein the waterproof member is molded while the coated electric wire is pressed toward the first direction at the first sides of the first and second molding portions and toward a second direction opposite to the first direction at the second sides of the first and second molding portions, the second sides being opposite to the first sides in the extending direction of the coated electric wire.

* * * * *